United States Patent
Hada et al.

(10) Patent No.: US 9,869,234 B2
(45) Date of Patent: Jan. 16, 2018

(54) STRUCTURE FOR RETAINING TEMPERATURE SENSING DEVICE AND INTERNAL COMBUSTION ENGINE PROVIDED WITH SAME

(71) Applicant: Aichi Machine Industry Co., Ltd., Nagoya-shi, Aichi (JP)

(72) Inventors: Masatoshi Hada, Nagoya (JP); Naonori Kinoshita, Nagoya (JP); Miyuki Yamazaki, Nagoya (JP); Norio Ito, Nagoya (JP); Koji Nishiyama, Nagoya (JP); Sadao Yamada, Ama (JP); Yoshihiro Takatani, Akaiwa (JP); Nobumitsu Okazaki, Akaiwa (JP)

(73) Assignee: Aichi Machine Industry, Co., Ltd., Nagoya (JP)

( * ) Notice: Subject to any disclaimer, the term of this patent is extended or adjusted under 35 U.S.C. 154(b) by 352 days.

(21) Appl. No.: 14/383,576

(22) PCT Filed: Mar. 4, 2013

(86) PCT No.: PCT/JP2013/055835
§ 371 (c)(1),
(2) Date: Sep. 8, 2014

(87) PCT Pub. No.: WO2013/137043
PCT Pub. Date: Sep. 19, 2013

(65) Prior Publication Data
US 2015/0107344 A1    Apr. 23, 2015

(30) Foreign Application Priority Data

Mar. 16, 2012    (JP) .................................. 2012-060641

(51) Int. Cl.
*F01P 11/16*    (2006.01)
*F01P 11/14*    (2006.01)
(Continued)

(52) U.S. Cl.
CPC ............... *F01P 11/16* (2013.01); *F01P 11/04* (2013.01); *F01P 11/14* (2013.01); *G01K 1/14* (2013.01);
(Continued)

(58) Field of Classification Search
CPC ........ G01K 2205/00; G01K 1/16; F01P 11/16
(Continued)

(56) References Cited

U.S. PATENT DOCUMENTS 4,831,886 A * 5/1989 Eberhardt ................. F01P 3/20
73/861.71
5,647,315 A * 7/1997 Saito .................. F01M 11/0004
123/195 C
(Continued)

FOREIGN PATENT DOCUMENTS

JP    55-36248 Y2    8/1980
JP    63-268944 A    11/1988
(Continued)

OTHER PUBLICATIONS

The Japanese Office Action for the corresponding Japanese patent application No. 2014-504798 dated Aug. 16, 2016.

*Primary Examiner* — R. A. Smith
*Assistant Examiner* — Herbert K Roberts
(74) *Attorney, Agent, or Firm* — Global IP Counselors, LLP

(57) ABSTRACT

A cooling pipe for an internal combustion engine includes with a resin-made water outlet for forming a circulation path for circulating a coolant for cooling an engine body, and an attachment part for retaining a water temperature sensor for sensing the temperature of the coolant flowing through the water outlet, the attachment part being attached to the water outlet, a portion of the attachment part being in contact with
(Continued)

the engine body, and the attachment part formed from a material whereby heat from the engine body is transmitted.

13 Claims, 27 Drawing Sheets

(51) Int. Cl.
    *G01K 1/14*     (2006.01)
    *G01K 13/02*     (2006.01)
    *F01P 11/04*     (2006.01)

(52) U.S. Cl.
    CPC .......... *G01K 13/02* (2013.01); *F01P 2025/32* (2013.01); *F01P 2025/46* (2013.01); *G01K 2013/026* (2013.01); *G01K 2205/00* (2013.01)

(58) Field of Classification Search
    USPC ........................................... 73/114.68
    See application file for complete search history.

(56) References Cited

U.S. PATENT DOCUMENTS

| | | | |
|---|---|---|---|
| 6,135,066 A * | 10/2000 | Matsuto | F01P 5/10 123/41.44 |
| 8,851,028 B2 * | 10/2014 | Pickelman, Jr. | F01P 5/04 123/195 P |
| 2005/0005893 A1 * | 1/2005 | Ito | F01L 1/024 123/195 C |
| 2006/0042566 A1 * | 3/2006 | Ito | F01P 7/16 123/41.08 |
| 2009/0056650 A1 * | 3/2009 | Tawarada | F28D 9/0012 123/41.44 |
| 2009/0080492 A1 * | 3/2009 | Takeuchi | G01K 1/14 374/144 |
| 2010/0050961 A1 * | 3/2010 | Taki | F02B 77/085 123/41.72 |
| 2010/0071647 A1 * | 3/2010 | Okada | F01L 1/022 123/90.31 |
| 2011/0265739 A1 * | 11/2011 | Watanabe | F01P 11/04 123/41.01 |

FOREIGN PATENT DOCUMENTS

| | | | |
|---|---|---|---|
| JP | 63268944 A | * | 11/1988 |
| JP | 2003-176721 A | | 6/2003 |
| JP | 2003176721 A | * | 6/2003 |
| JP | 2006-70760 A | | 3/2006 |
| JP | 2009-62938 A | | 3/2009 |
| JP | 2011-231722 A | | 11/2011 |

\* cited by examiner

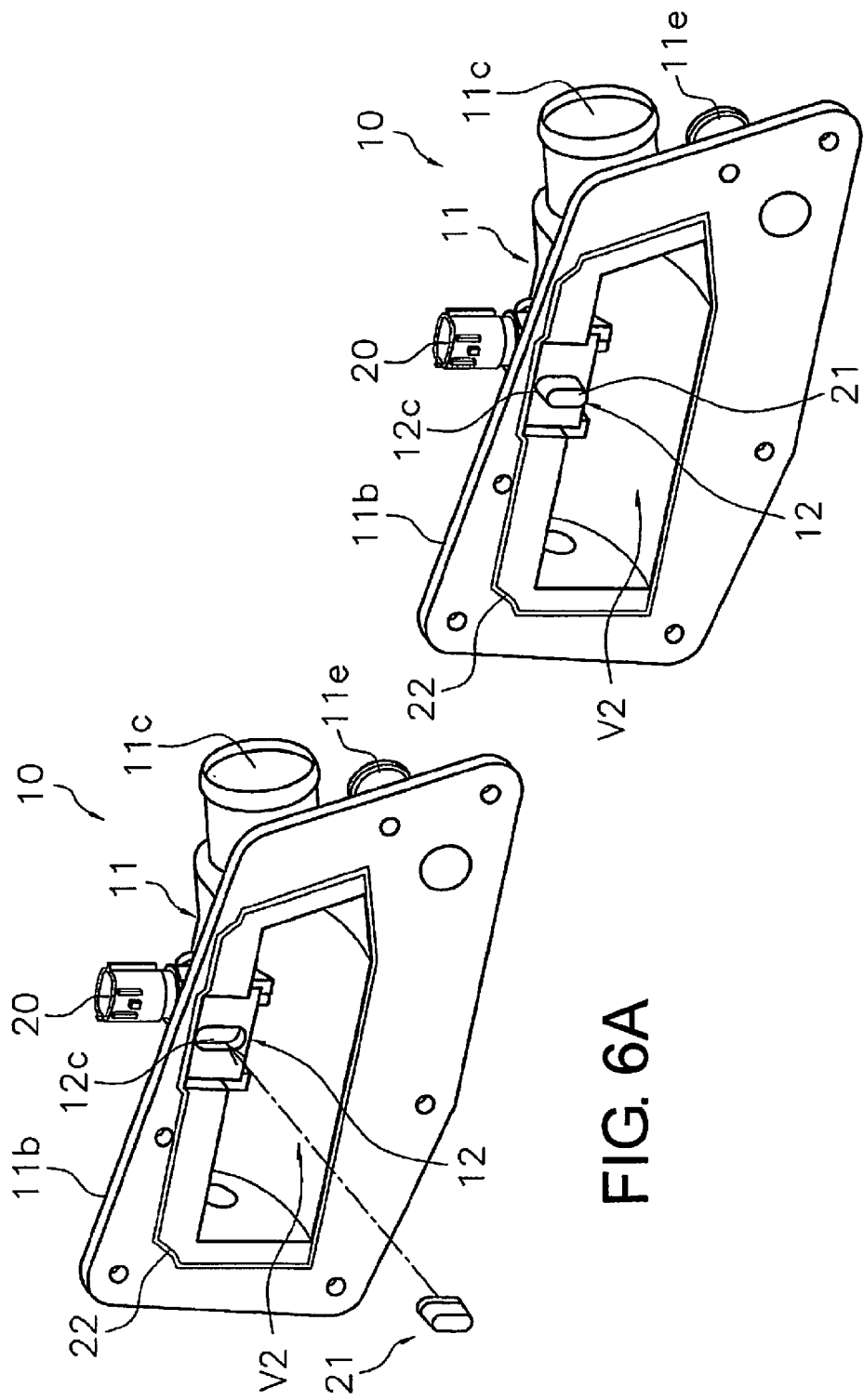

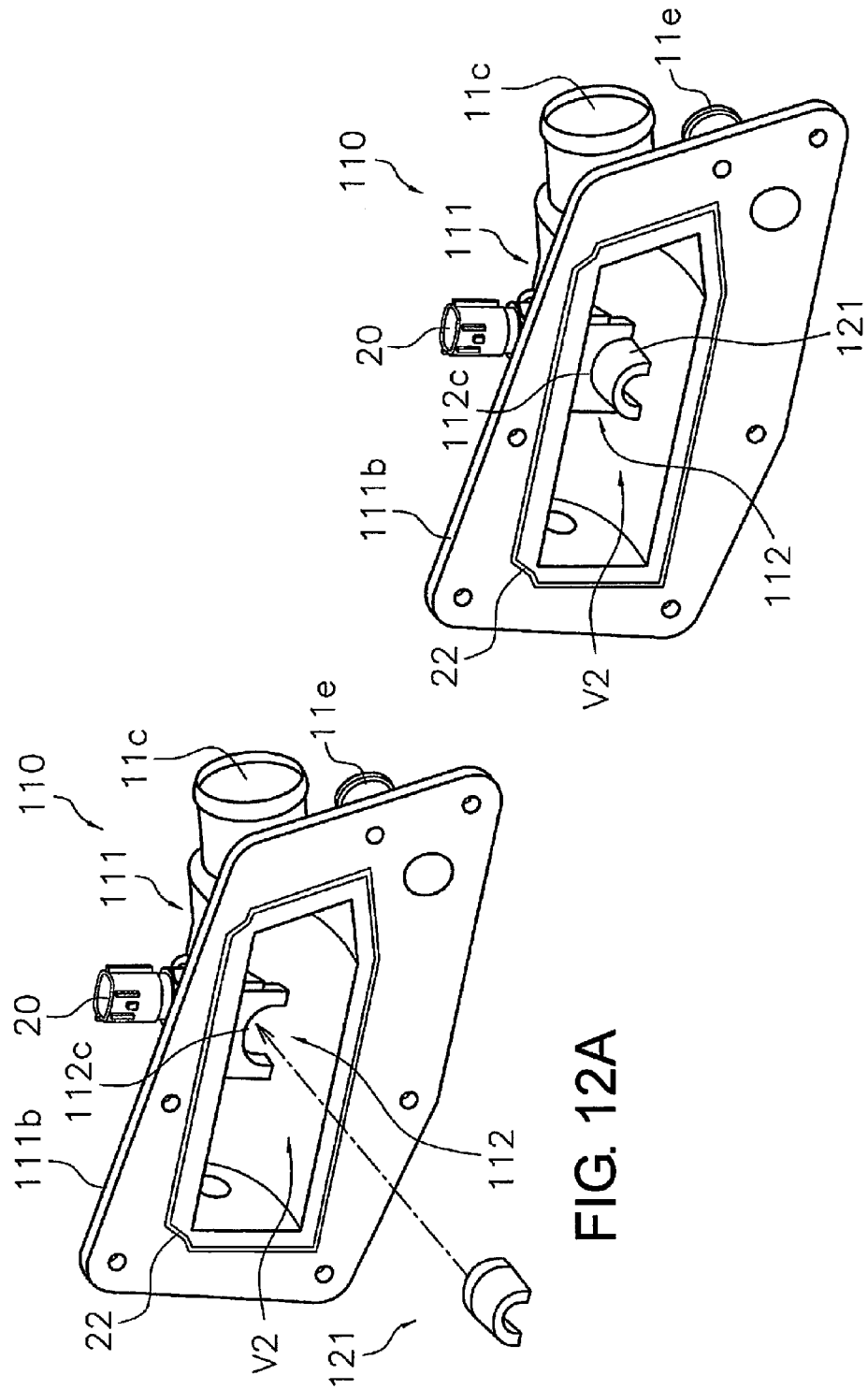

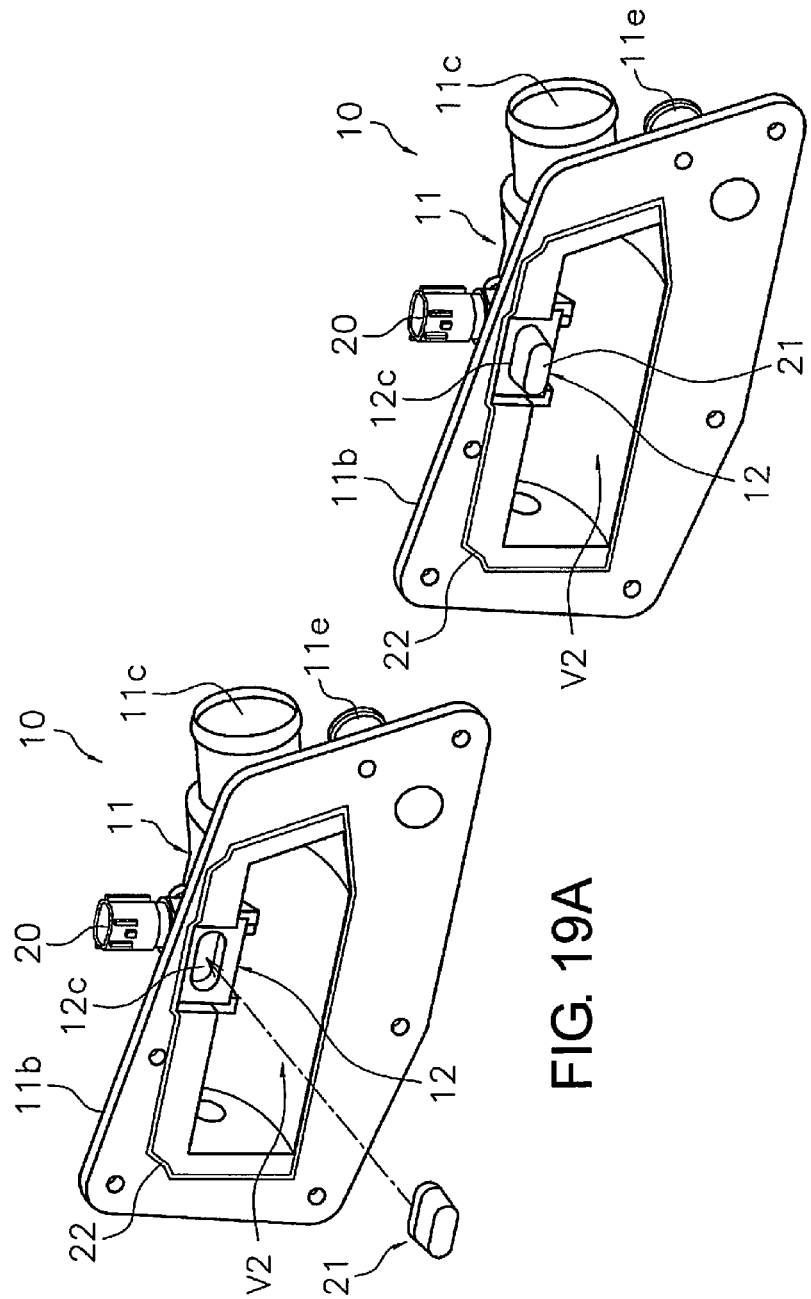

STRUCTURE FOR RETAINING TEMPERATURE SENSING DEVICE AND INTERNAL COMBUSTION ENGINE PROVIDED WITH SAME

CROSS-REFERENCE TO RELATED APPLICATIONS

This application is a U.S. National stage application of International Application No. PCT/JP2013/055835, filed Mar. 4, 2013, which claims priority to Japanese Patent Application No. 2012-060641 filed in Japan on Mar. 16, 2012, the contents of each of which are hereby incorporated herein by reference.

BACKGROUND

Field of the Invention

The present invention relates to a retaining structure for a temperature detection device, and to an internal combustion engine provided with the same.

Background Information

In a conventional internal combustion engine for a vehicle or the like, overheating due to the combustion heat of an engine body is suppressed through use of a coolant (cooling medium) that is circulated through a radiator.

In order to reduce weight and cost, tubing molded from heat-resistant resin has recently been used as a member for constituting a coolant circulation path for circulating a coolant such as described above.

Japanese Laid-Open Patent Application No. 2003-176721 (27 Jun. 2003) discloses a structure for retaining a temperature detection element for detecting the temperature of an engine body in a heat-resistant resin pipe by integrally molding, through use of insert molding, the temperature detection element in a portion of the resin pipe that is joined to the engine body.

Through this retaining structure, since the temperature detection element is insert-molded in the portion of the resin pipe that is joined to the engine body, the temperature of the engine body can easily be detected by the temperature detection element even when the amount of coolant flowing through a circulation path is inadequate as a result of using the internal combustion engine in a harsh environment.

SUMMARY

However, the conventional retaining structure for a temperature detection device of an internal combustion engine described above has drawbacks such as those described below.

Specifically, in the conventional configuration disclosed in the abovementioned publication, the temperature detection element detects the temperature of the coolant via the engine even when the amount of coolant is inadequate. This configuration therefore lacks accuracy in comparison with detecting the coolant temperature directly.

An object of the present invention is to provide a retaining structure for a temperature detection device capable of accurately sensing the temperature of an engine body and quickly detecting overheating, regardless of an increase or decrease in the amount of coolant, and to provide an internal combustion engine provided with the retaining structure for a temperature detection device.

The retaining structure for a temperature detection device according to the present invention is provided with a resin-made cooling medium circulation part and an attachment part. The resin-made cooling medium circulation part forms a portion of a circulation path for circulating a cooling medium for cooling an engine body. The attachment part retains a temperature detection device for detecting the temperature of the cooling medium flowing through the circulation path, so that a temperature sensing part of the temperature detection device protrudes into the circulation path. The attachment part is also formed from a material capable of transmitting heat of the engine body to the temperature detection device, and is attached to the cooling medium circulation part in a state in which a portion of the attachment part is in contact with the engine body.

Through the retaining structure for a temperature detection device according to the present invention, the temperature of the engine body can be accurately sensed and overheating can be quickly detected without melting of a resin-made cooling medium circulation part for circulating the cooling medium.

BRIEF DESCRIPTION OF THE DRAWINGS

Referring now to the attached drawings which form a part of this original disclosure.

FIGS. 6A and 6B are views showing the transmitting member used in the joining portion between the coolant housing and cylinder head of FIG. 2 being inserted on the coolant housing side;

FIGS. 12A and 12B are views showing the transmitting member used in the joining portion between the coolant housing and cylinder head of FIG. 8 being inserted on the coolant housing side;

FIGS. 19A and 19B are views showing the transmitting member used in the joining portion between the coolant housing and cylinder head of FIG. 17 being inserted on the coolant housing side;

DETAILED DESCRIPTION OF THE EMBODIMENTS

First Embodiment

An internal combustion engine 50 in which is mounted a coolant housing according to an embodiment of the present invention will be described using FIGS. 1 through 7B.

Configuration of the internal combustion engine 50

Figure 1:
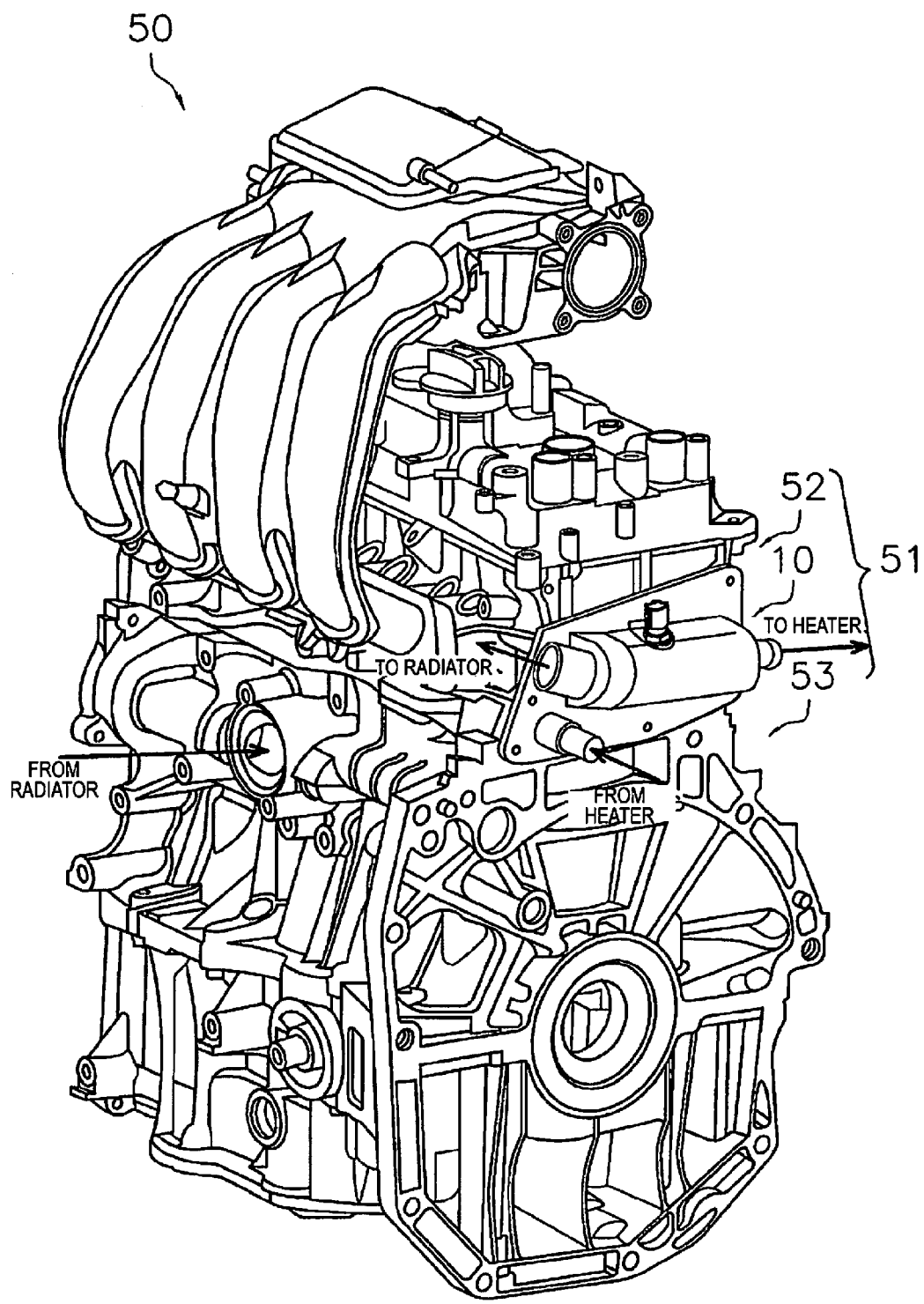
FIG. 1 is a perspective view showing the configuration of an internal combustion engine in which is mounted the retaining structure for a temperature detection device according to a first embodiment of the present invention.

As shown in FIG. 1, the internal combustion engine 50 according to the present embodiment is includes an engine body 51 and a coolant housing 10 for sending coolant circulated by a water pump (not shown) to a radiator or a heater (not shown) to dissipate heat generated in the engine body 51.

The engine body 51 is a metal-made member constituting of a main portion of the internal combustion engine 50, and is configured so as to include a cylinder head 52 at a top part of the internal combustion engine 50, and a cylinder block 53 at a bottom part of the cylinder head 52.

The coolant housing 10 is attached to a front surface of the cylinder head 52. A circulation path V1 (see FIG. 3) for circulating a coolant is formed inside the cylinder head 52. Here, two surfaces along the longitudinal direction in an insertion hole (recess) 52*a* form two substantially parallel surfaces (a so-called width across the flat portions). The width across the flat portions of the insertion hole (recess) 52*a* is formed so as to be somewhat larger than the width across the flat portions of a positioning member 21 described hereinafter, and the positioning member 21 is in surface contact with the insertion hole 52*a* when inserted therein. The elliptically shaped insertion hole (recess) 52*a* formed so that the longitudinal direction thereof is oriented substantially vertically and is formed in the front surface of the cylinder head 52, to which the coolant housing 10 is attached.

Rib parts 52*b*, 52*b* for connecting a combustion-chamber-proximal part and an insertion-hole-52*a*-proximal part are disposed in an open part constituting the circulation path V1 in the cylinder head 52, and divide the circulation path V1 into three portions in a substantially horizontal direction. Heat is thereby transmitted linearly through the rib parts 52*b*, 52*b* when heat is transmitted from below the cylinder head 52 in which a combustion chamber of the internal combustion engine is disposed. As a result, the heat of the combustion chamber during an instance of overheating can be more efficiently transmitted to a water temperature sensor 20 without inhibition of the flow of coolant through the circulation path V1 toward the water temperature sensor 20. An instance of overheating can thereby be sensed at a relatively early stage in comparison with a configuration in which the rib parts 52*b*, 52*b* are not provided.

Figure 2:
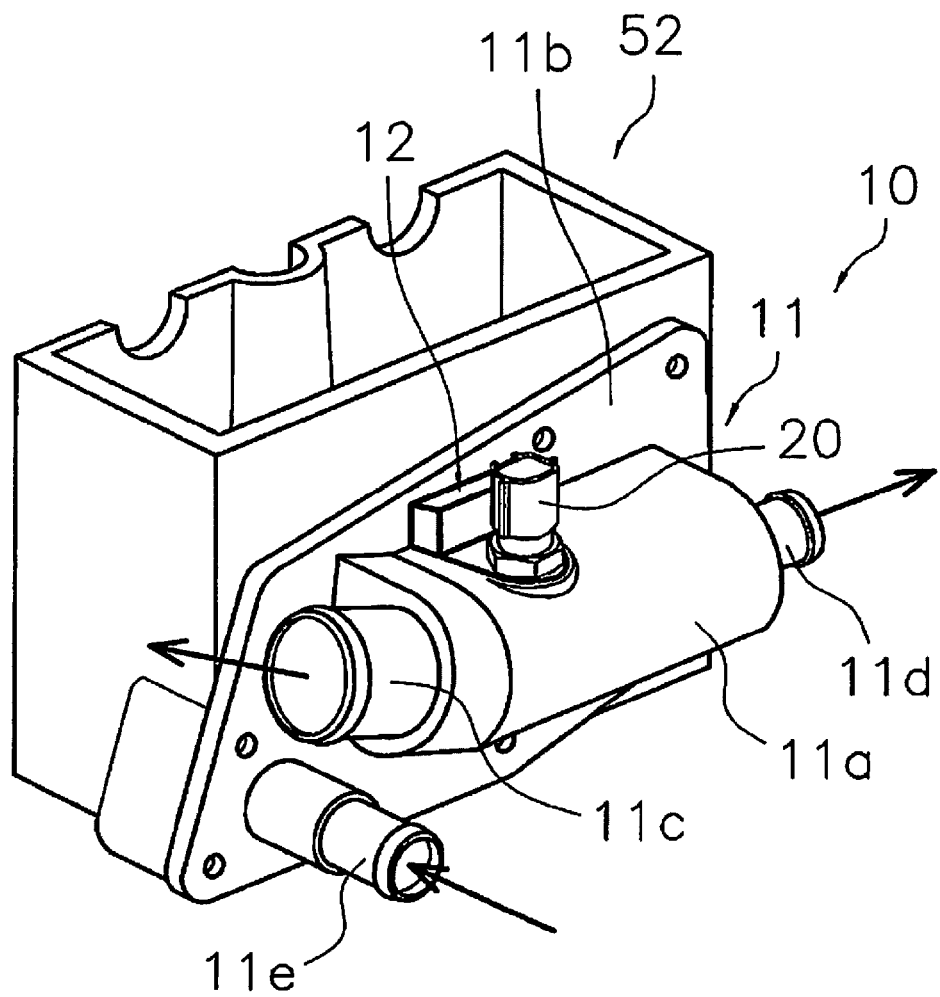
FIG. 2 is a perspective view showing the configuration of the coolant housing mounted to the internal combustion engine of FIG. 1.

As shown in FIG. 2, the coolant housing 10 is attached to the cylinder head 52, and sends coolant circulated by a water pump (not shown) to a radiator or a heater (not shown) to dissipate combustion heat generated in the internal combustion engine 50, and forms a portion of a circulation path for coolant circulated by a water pump (not shown) provided inside the engine body 51. The detailed configuration of the coolant housing 10 will be described hereinafter. The arrows shown in FIG. 1 indicate the direction of flow of coolant on the periphery of the coolant housing 10.

Coolant Housing 10

As shown in FIG. 2, the coolant housing 10 includes a water outlet (cooling medium circulation part) 11, an attachment part 12, a water temperature sensor (temperature detection device) 20, the positioning member (transmitting member) 21 (see FIG. 6A, etc.), and a seal member 22.

Water Outlet 11

Figure 4:
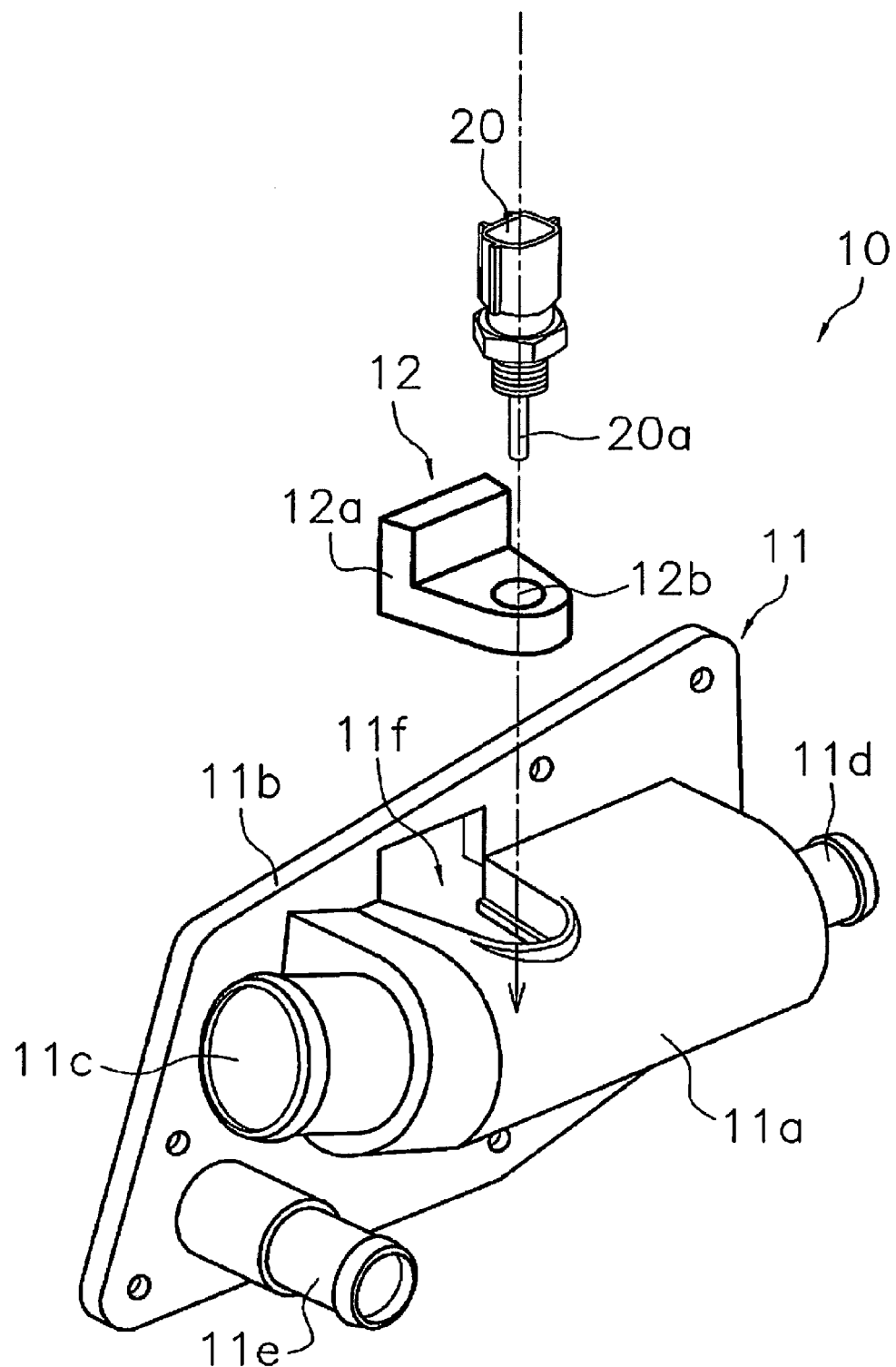
FIG. 4 is an exploded perspective view of the coolant housing of FIG. 2.

As shown in FIG. 2, the water outlet (cooling medium circulation part) 11 is a resinous member for forming a circulation path V2 (see FIG. 5B) for sending coolant circulated by a water pump (not shown) to a radiator or a heater (also not shown), and has a main body part 11a, a joining plate 11b, a first connector 11c, a second connector 11d, a third connector 11e, and an installation recess 11f (see FIG. 4).

The main body part 11a is a substantially cylindrical member having an internal space which constitutes the circulation path V2, and is disposed in a substantially horizontal direction in a state in which the water outlet 11 is attached to the cylinder head 52. The water temperature sensor 20 is also attached to a top part of the main body part 11a via the attachment part 12. The temperature of the coolant flowing through the circulation path V2 formed in the main body part 11a can thereby be sensed by the water temperature sensor 20 at a temperature sensing part 20a (see FIG. 7A) which protrudes into the circulation path V2.

Figure 3:
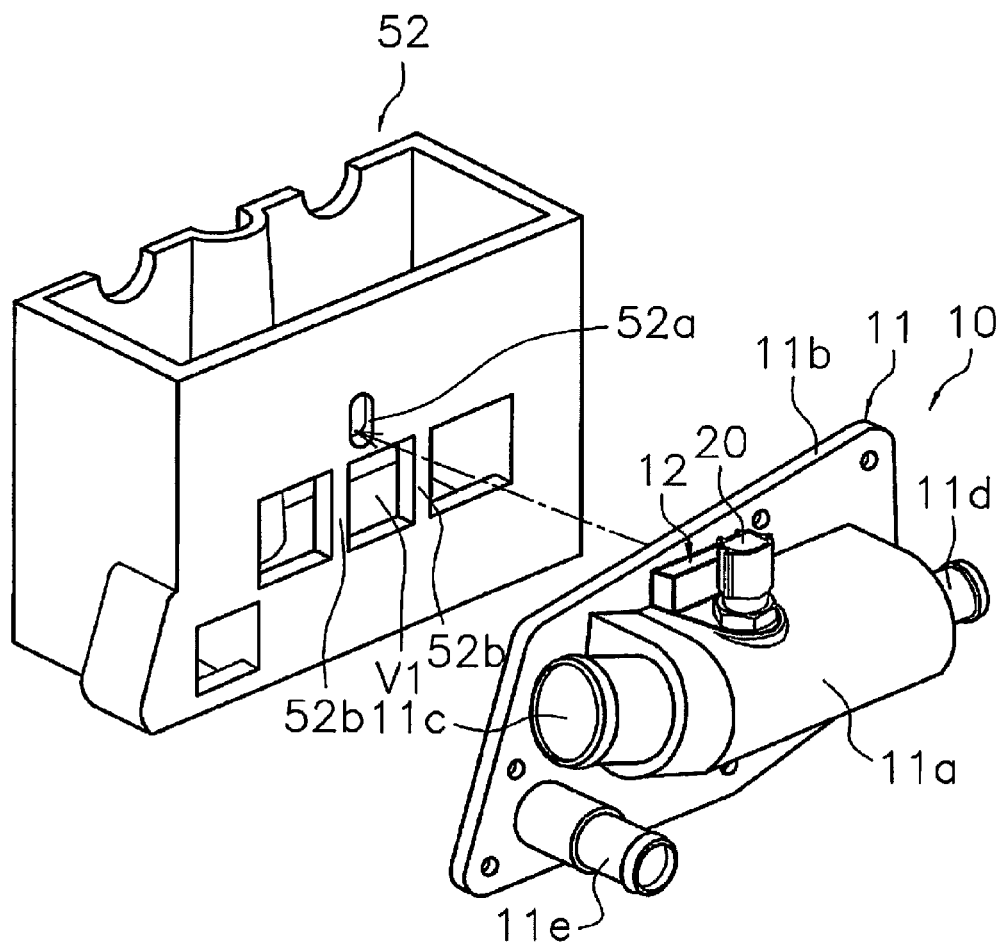
FIG. 3 is a perspective view showing the configuration of the area surrounding the joining portion between the coolant housing and cylinder head of FIG. 2.

As shown in FIGS. 2 and 3, the joining plate 11b is a plate-shaped member disposed on the side of the main body part 11a that is joined to the cylinder head 52, and one surface of the plate shape of the joining plate 11b is fixed in a state of abutting the cylinder head 52. An annular seal member 22 described hereinafter is also provided on the side of the joining plate 11b that is joined to the cylinder head 52.

The first connector 11c is joined to a pipe connected to a coolant inlet of a radiator (not shown) for exchanging heat between the coolant and air, and the first connector 11c returns coolant to the radiator.

A pipe connected to a heater (not shown) provided as a heat exchanger for effectively utilizing heat generated in the internal combustion engine 50 is joined to the second connector 11d, and supplies coolant to the heater.

A pipe to which coolant circulated and returned to the abovementioned heater is supplied is joined to the third connector 11e.

As shown in FIG. 4, the installation recess 11f is formed in a top surface of the main body part 11a, and is a through-hole communicated to the circulation path V2, and the attachment part 12 described hereinafter is attached thereto together with the water temperature sensor 20.

Attachment Part 12

Figure 5A:
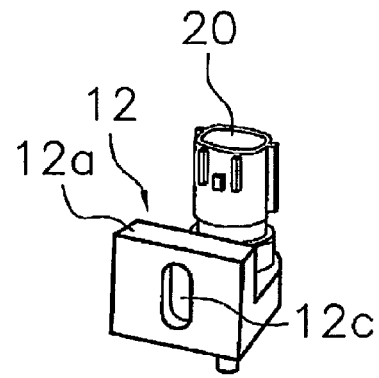
FIG. 5A is a perspective view showing the configuration of the water temperature sensor and attachment part attached to the coolant housing of FIG. 2.
Figure 5B:
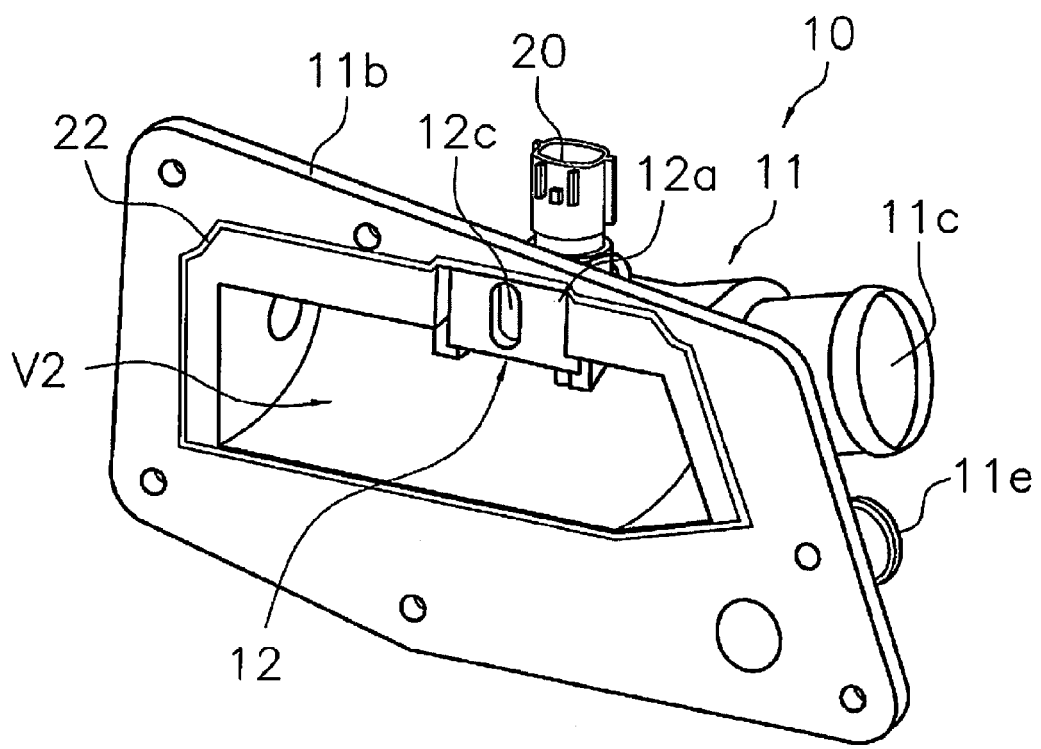
FIG. 5B is a perspective view showing a state in which the water temperature sensor and the attachment part are attached to the water outlet.

As shown in FIG. 4, the attachment part 12 is a metallic (preferably aluminum or brass) member for attaching the water temperature sensor 20 to the main body part 11a of the water outlet 11. The attachment part 12 is attached in liquid-tight fashion to the installation recess 11f so that no gap is formed between the attachment part 12 and the water outlet 11. Furthermore, as shown in FIG. 5B, in a state in which the attachment part 12 is attached to the water outlet 11, the attachment part 12 is disposed on the inside of the annular seal member 22 provided on a joining surface side of the joining plate 11b. The attachment part 12 has a main body part 12a, a sensor insertion part 12b, and an insertion hole 12c (see FIG. 5A).

The main body part 12a is substantially L-shaped as viewed from a side thereof, the insertion hole 12c is formed in a back surface portion of the substantial L shape, and the sensor insertion part 12b is formed in a bottom side portion thereof.

As shown in FIG. 4, the sensor insertion part 12b is a through-hole into which a temperature sensing part 20a side of the water temperature sensor 20 is inserted and fixed. In the state in which the attachment part 12 is attached to the water outlet 11, the sensor insertion part 12b is communicated with the circulation path V2 formed inside the water outlet 11.

The insertion hole 12c is a recess formed in a back side of the main body part 12a, and the metal-made positioning member 21 (see FIG. 6A, etc.) described in detail hereinafter is inserted therein. The insertion hole 12c has an elliptical shape. The insertion hole 12c is also formed so that the longitudinal direction of the ellipse thereof is oriented substantially vertically, and two surfaces thereof aligned with the longitudinal direction thereof form two substantially parallel surfaces (a so-called width across the flat portions), in the same manner as the insertion hole 52a of the cylinder head 52. The width across the flat portions of the insertion hole 12c is formed so as to be somewhat smaller than the width across the flat portions of the positioning member 21 described hereinafter, and the positioning member 21 described hereinafter is press-fitted in the insertion hole 12c in the width across the flat portions, whereby the positioning member 21 is integrally attached to the attachment part 12.

Water Temperature Sensor 20

The water temperature sensor 20 is a sensor for measuring the temperature of the coolant flowing through the circulation path V2, and as shown in FIG. 4, the water temperature sensor 20 has a temperature sensing part 20a in a distal-end portion thereof that is inserted into the circulation path V2. The water temperature sensor 20 is fixed by being screwed into a screw hole in the sensor insertion part 12b of the attachment part 12.

The temperature sensing part 20a measures the temperature of the coolant flowing through the circulation path V2 in the coolant housing 10. When the amount of coolant in the circulation path V2 is reduced as a result of the internal combustion engine 50 being used in a harsh environment, for example, heat on the engine body 51 (cylinder head 52) side is transmitted through the metal-made positioning member 21 and the attachment part 12, and the temperature sensing part 20a measures the temperature of the engine body 51.

In the water temperature sensor 20, the coolant temperature in the circulation path V2 under normal conditions is thereby measured, and the temperature of the engine body 51 is measured when the amount of coolant in the circulation path V2 is reduced. Overheating can thereby be reliably and quickly detected.

Positioning Member 21

The positioning member 21 is a metal-made block having a substantially elliptical cross-section that is provided in a joining portion between the cylinder head 52 and the coolant housing 10, and as shown in FIGS. 6A and 6B, the positioning member 21 is used in a state of being inserted in the insertion hole 12c of the attachment part 12 and the insertion hole 52a of the cylinder head 52. Here, two surfaces of the positioning member 21 aligned in the longitudinal direction thereof form two substantially parallel surfaces (a so-called width across the flat portions). As described above, the positioning member 21 is press-fitted in the insertion hole 12c, and positions the integrated attachment part 12, i.e., the coolant housing 10, with respect to the cylinder head 52 in the width direction of the width across the flat portions (the direction at a right angle to the vertical direction).

Furthermore, since the positioning member 21 is molded from a metal-made material, the positioning member 21 also functions as a transmitting member for transmitting heat generated in the engine body 51 (cylinder head 52) to the water temperature sensor 20 via the attachment part 12, which is also molded from a metal-made material.

Figure 7A:
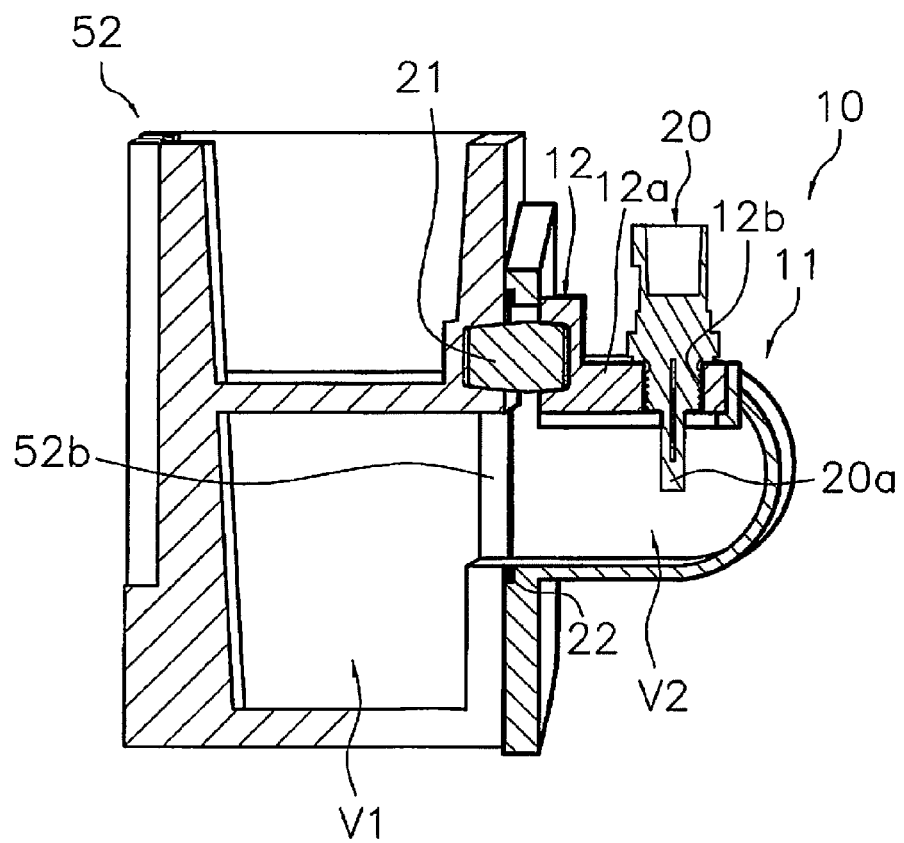
FIG. 7A is an enlarged sectional view showing the configuration of the joining portion between the coolant housing and cylinder head of FIG. 2, and FIG. 7 Bis a partial enlarged view showing the size relationship between the positioning member and the insertion hole in the joining portion.

As shown in FIG. 7A, the positioning member 21 is shaped so as to taper toward the side thereof that is inserted into the cylinder head 52. When the coolant housing 10 is attached to the joining surface side of the cylinder head 52, the positioning member 21 can be easily inserted toward the insertion hole 52a side even when the positioning member 21 is first inserted in the insertion hole 12c on the coolant housing 10 side and subsequently inserted in the insertion hole 52a on the cylinder head 52 side as shown in FIG. 6B.

Figure 7B:
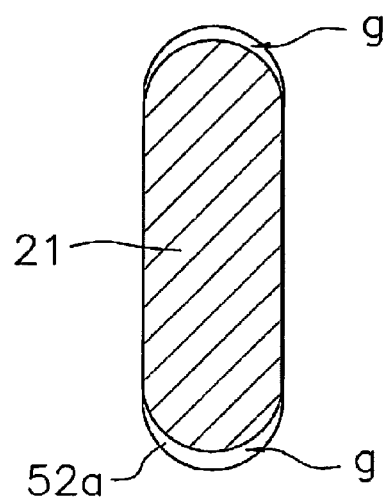

As shown in FIG. 7B, the insertion hole 52a is formed so that the width of the insertion hole 52a in the longitudinal direction is somewhat larger than the width of the positioning member 21 in the longitudinal direction in a state in which the positioning member 21 is inserted in the insertion hole 52a. A gap g formed in the width direction in this longitudinal direction can thereby be caused to function as a pressure relief part for alleviating pressure when the positioning member 21 is fitted in the insertion hole 52a formed on the cylinder head 52 side.

The positioning member 21 is inserted in the insertion hole 12c and the insertion hole 52a in a state in which the longitudinal direction of the substantially elliptical shape thereof is aligned in a substantially vertical direction.

Here, the resin-made water outlet 11 and the metal-made attachment part 12 have different thermal expansion coefficients. Therefore, when heat from the engine body 51 is transmitted and the resin-made water outlet 11 deforms so as to extend in the vertical direction, for example, the thermal expansion of the water outlet 11 may be restricted by the metal-made attachment part 12, which has a small thermal expansion coefficient relative to a resin. In this case, a force in a shear direction is exerted on the seal member 22 described hereinafter, and there is a risk of a decrease in seal performance.

The attachment part 12, having a substantially elliptical cross-section, is therefore attached so that the longitudinal direction thereof is oriented in the vertical direction in the present embodiment, so that such a problem does not occur even when there is a difference between the thermal expansion coefficients of the water outlet 11 and the attachment part 12, which have different material properties.

The seal performance of the seal member 22 can thereby be prevented from decreasing even when the water outlet 11 and the attachment part 12 have undergone thermal expansion.

Seal Member 22

As shown in FIGS. 6A and 6B, the seal member 22 is an elastic member formed having an annular shape so as to surround the cross-section of the space where the circulation path V2 is formed and the attachment part 12 portion on the joining surface side of the joining plate 11b.

As shown in FIG. 7A, in a state in which the coolant housing 10 is attached to the cylinder head 52, the seal member 22 is held and crushed between a joining surface on the cylinder head 52 side and a joining surface on the coolant housing 10 side.

The coolant flowing through the circulation paths V1, V2 can thereby be prevented from leaking from the joining portion.

<Features>

(1) As shown in FIG. 3, the coolant housing 10 of the internal combustion engine 50 according to the present embodiment is provided with: the resin-made water outlet 11 for forming the circulation path V2 for circulating coolant for cooling the engine body 51; the attachment part 12 for retaining the water temperature sensor 20 for sensing the temperature of the coolant flowing through the water outlet 11, the attachment part 12 being attached to the water outlet 11 and formed from a material whereby heat of the engine body 51 is transmitted; and the positioning member 21 attached to the attachment part 12 and formed from a material whereby heat of the engine body 51 is transmitted, in the same manner as the attachment part 12, a portion of the positioning member 21 being in contact with the engine body 51.

By this configuration, when an adequate amount of coolant is flowing through the circulation path V2, the water temperature is sensed by the temperature sensing part 20a of the water temperature sensor 20, and overheating on the engine body 51 side can thereby be reliably detected on the basis of the sensed water temperature.

Furthermore, in the coolant housing 10 of the internal combustion engine 50 according to the present embodiment, even when the amount of coolant flowing through the circulation path V2 is inadequate due to such factors as a harsh usage environment, the temperature on the engine body 51 side can be transmitted to the temperature sensing part 20a of the water temperature sensor 20 via the attachment part 12 and the positioning member 21, molded from a material having a high thermal conductivity and abutting the cylinder head 52.

Heat on the engine body 51 side is thereby sensed via the attachment part 12, whereby overheating on the engine body 51 side can easily be detected on the basis of the temperature sensed by the water temperature sensor 20.

Even when the water outlet 11 constituting the majority of the coolant housing 10 is resin-made, by using a material having high thermal conductivity (here, a metal) to form the attachment part 12 for retaining the water temperature sensor 20 and the positioning member 21 abutting the cylinder head 52, overheating on the engine body 51 side can be more reliably and quickly detected than by the conventional configuration, in which overheating can be detected only after a resin around the water temperature sensor 20 has melted.

(2) In the coolant housing 10 of the internal combustion engine 50 according to the present embodiment, the attachment part 12 is provided to the water outlet 11 so that the water temperature sensor 20 is disposed in a top part of the circulation path V2, as shown in FIG. 7A.

Since there is thereby no need for such operations as removing the coolant when dismounting the water temperature sensor 20, ease of maintenance can be enhanced relative to a configuration in which the water temperature sensor is disposed below the circulation path V2 for the coolant.

Furthermore, since extremely hot water vapor fills a top space of the circulation path V2 when an inadequate amount of coolant is flowing through the circulation path V2, the functioning whereby the water temperature sensor 20 senses overheating via the attachment part 12 can be enhanced.

(3) As shown in FIG. 3, in the coolant housing 10 of the internal combustion engine 50 according to the present embodiment, the rib parts 52b, 52b for connecting a combustion-chamber-proximal part and an insertion-hole-52*a*-proximal part are provided in an open part constituting the circulation path V1 in the cylinder head 52

Through this configuration, when is transmitted from below the cylinder head 52 in which the combustion chamber of the internal combustion engine 50 is disposed, since heat is linearly transmitted via the rib parts 52*b*, 52*b*, the heat of the combustion chamber during an instance of overheating can be more efficiently transmitted to the water temperature sensor 20 without inhibition of the flow of coolant through the circulation path V1 toward the water temperature sensor 20.

(4) In the coolant housing 10 of the internal combustion engine 50 according to the present embodiment, the attachment part 12 is disposed in a portion where contact is made with the cylinder head 52, being disposed so as to stay clear of the portion where the coolant flowing through the circulation path V2 and the temperature sensing part 20*a* of the water temperature sensor 20 come in contact with each other, as shown in FIG. 7A.

Through this configuration, when an adequate amount of coolant is flowing through the circulation path V2, it is possible to prevent the attachment part 12 from inhibiting contact between the coolant and the temperature sensing part 20*a* of the water temperature sensor 20. The water temperature can therefore be accurately sensed in the water temperature sensor 20.

(5) In the coolant housing 10 of the internal combustion engine 50 according to the present embodiment, the positioning member 21 is fixed to the engine body 51 in a state of mutual surface contact in the width across the flat portions with the insertion hole 52*a* formed on the engine body 51 side, as shown in FIG. 7B.

Through this configuration, the coolant housing 10 and the engine body 51 can be stably joined, looseness at the joining portion therebetween being kept to a minimum, and heat generated on the engine body 51 side can be reliably transmitted to the water temperature sensor 20 side.

Insofar as the positioning member 21 and the insertion hole 52*a* can be in surface contact with each other (the positioning member 21 abutting the cylinder head 52 in planar fashion), the configuration of this contact is not limited to a width across the flat portions, and the positioning member 21 and the insertion hole 52*a* may also be in surface contact with each other according to another configuration, such as in contact with one surface or with three surfaces.

(6) In the coolant housing 10 of the internal combustion engine 50 according to the present embodiment, the attachment part 12 for retaining the water temperature sensor 20, and the positioning member 21 for transmitting heat generated in the engine body 51 to the attachment part 12, the positioning member 21 being disposed in the joining portion between the water outlet 11 and the cylinder head 52, are formed as separate elements, as shown in FIG. 7A.

Through this configuration, a structure can easily be formed for transmitting the temperature of the engine body 51 to the water temperature sensor 20 when the amount of coolant flowing through the circulation path V2 is inadequate.

(7) In the coolant housing 10 of the internal combustion engine 50 according to the present embodiment, the positioning member 21 protrudes from the water outlet 11, and is inserted in the insertion hole 52*a* formed on the cylinder head 52 side, as shown in FIG. 6B, and the water outlet 11 is thereby positioned with respect to the cylinder head 52.

Through this configuration, there is no need for a dedicated component for positioning when attaching the water outlet 11 to the cylinder head 52, and the coolant housing 10 can easily be attached to the cylinder head 52.

(8) In the coolant housing 10 of the internal combustion engine 50 according to the present embodiment, the positioning member 21 has a shape that narrows toward a distal end thereof on the side thereof that is inserted into the insertion hole 52*a* on the cylinder head 52 side, as shown in FIG. 7A.

Fitting of the positioning member 21 in the insertion hole 52*a* on the cylinder head 52 side can thereby be facilitated.

(9) In the coolant housing 10 of the internal combustion engine 50 according to the present embodiment, the water outlet 11 has an annular seal member 22 for preventing coolant from leaking out on the joining surface side of the joining plate 11*b*, as shown in FIG. 5B, etc. The attachment part 12 is also in indirect contact with the cylinder head 52 in the inside of the annular seal member 22 so as to be able to transmit heat.

Through this configuration, leakage of coolant can be prevented along the external periphery of the attachment part 12 for retaining the water temperature sensor 20.

Second Embodiment

An internal combustion engine in which is mounted a coolant housing according to another embodiment of the present invention will be described using FIGS. 8 through 13.

Specifically, in the coolant housing according to the present embodiment, the shapes of a positioning member 121 and a metal-made attachment part 112 for retaining the water temperature sensor 20, and the structure peripheral thereto differ from those of the attachment part 12 and the positioning member 21 according to the first embodiment described above. However, since all other aspects of the configuration of the present embodiment are the same as in the first embodiment, members having the same configuration, function, etc., as members appearing in the first embodiment are referred to by the same reference symbols, and are not described below.

A coolant housing 110 is attached to a front surface of a cylinder head 152. A circulation path V1 (see FIG. 9) for circulating a coolant is formed inside the cylinder head 152. An insertion hole (recess) 152*a* is formed in the front surface of the cylinder head 152, to which the coolant housing 110 is attached.

The insertion hole 152*a* is formed as a notched portion opened to the circulation path V1 and having a substantially semicircular shape as viewed from the frontal direction of flow of the coolant. In this substantially semicircular notched portion, two substantially parallel surfaces (a so-called width across the flat portions) are formed so that the positioning member 121 described hereinafter can be in surface contact therewith.

Figure 9:
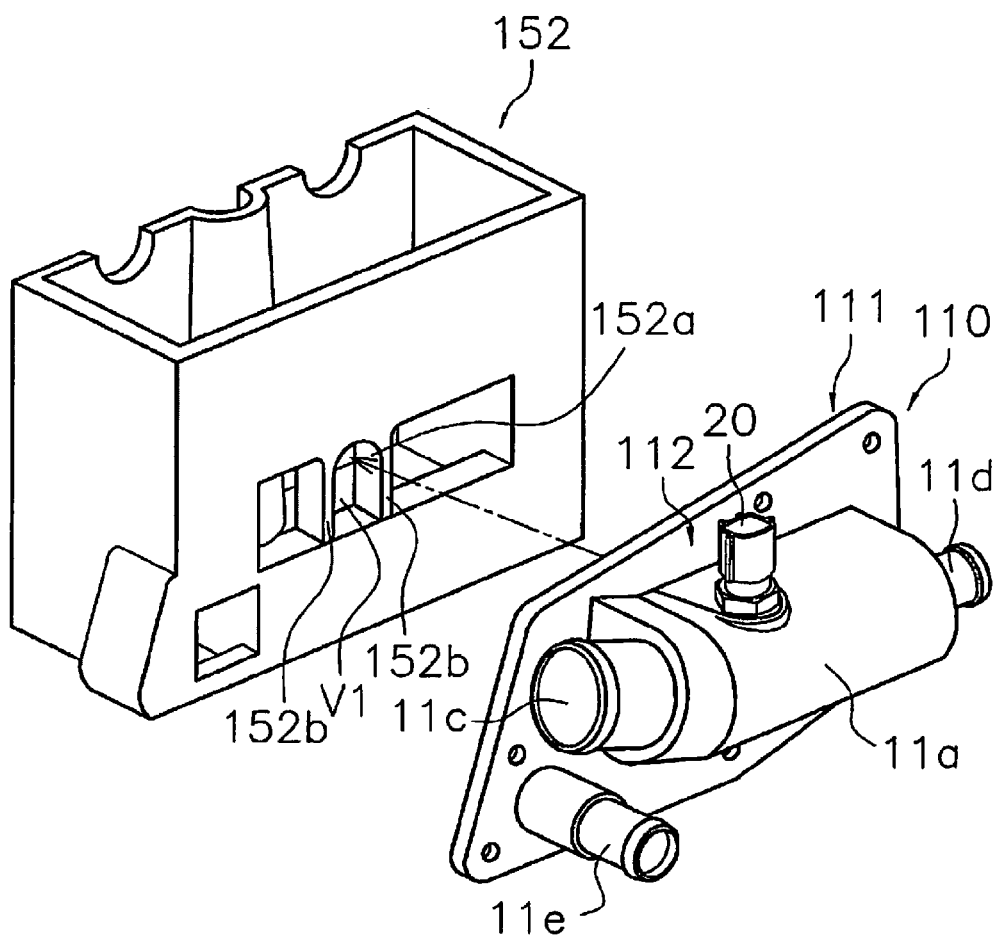
FIG. 9 is a perspective view showing the configuration of the joining portion between the coolant housing and cylinder head of FIG. 8.

As shown in FIG. 9, the insertion hole 152*a* is formed so as to be interposed between rib parts 152*b*, 152*b* which are provided on the cylinder head 152 side so as to divide the circulation path V1. Here, the two substantially parallel surfaces (width across the flat portions) formed by the rib parts 152*b*, 152*b* are formed so as to be somewhat larger than the width across the flat portions of the positioning member 121 described hereinafter, and are in surface contact when the positioning member 121 is inserted in the insertion hole 152*a*.

Heat is transmitted linearly to the positioning member 121 via the rib parts 152b, 152b when heat is transmitted from below the cylinder head 152 in which a combustion chamber of the internal combustion engine is disposed. As a result, the heat of the combustion chamber during an instance of overheating can be more efficiently transmitted to a water temperature sensor 20 without inhibition of the flow of coolant through the circulation path V1 toward the water temperature sensor 20. An instance of overheating can thereby be sensed at a relatively early stage in comparison with a configuration in which the rib parts 152b, 152b are not provided.

Figure 8:
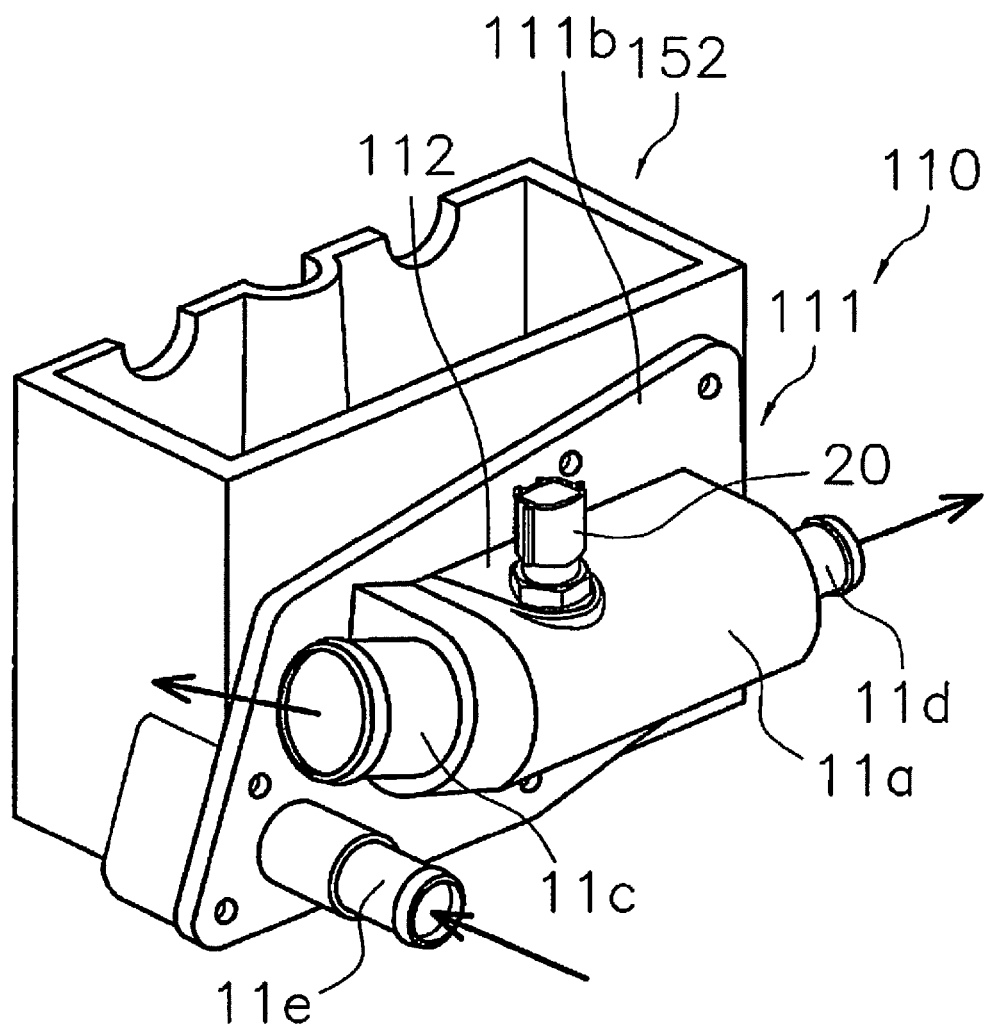
FIG. 8 is a perspective view showing the configuration of the coolant housing mounted to an internal combustion engine according to another embodiment of the present invention.

As shown in FIG. 8, the coolant housing 110 is attached to the cylinder head 152, and forms a circulation path for coolant circulated by a water pump (not shown). As shown in FIG. 8, the coolant housing 110 is provided with a water outlet (cooling medium circulation part) 111, the attachment part 112, the water temperature sensor 20, and the positioning member (transmitting member) 121 (see FIG. 12A, etc.).

Figure 10:
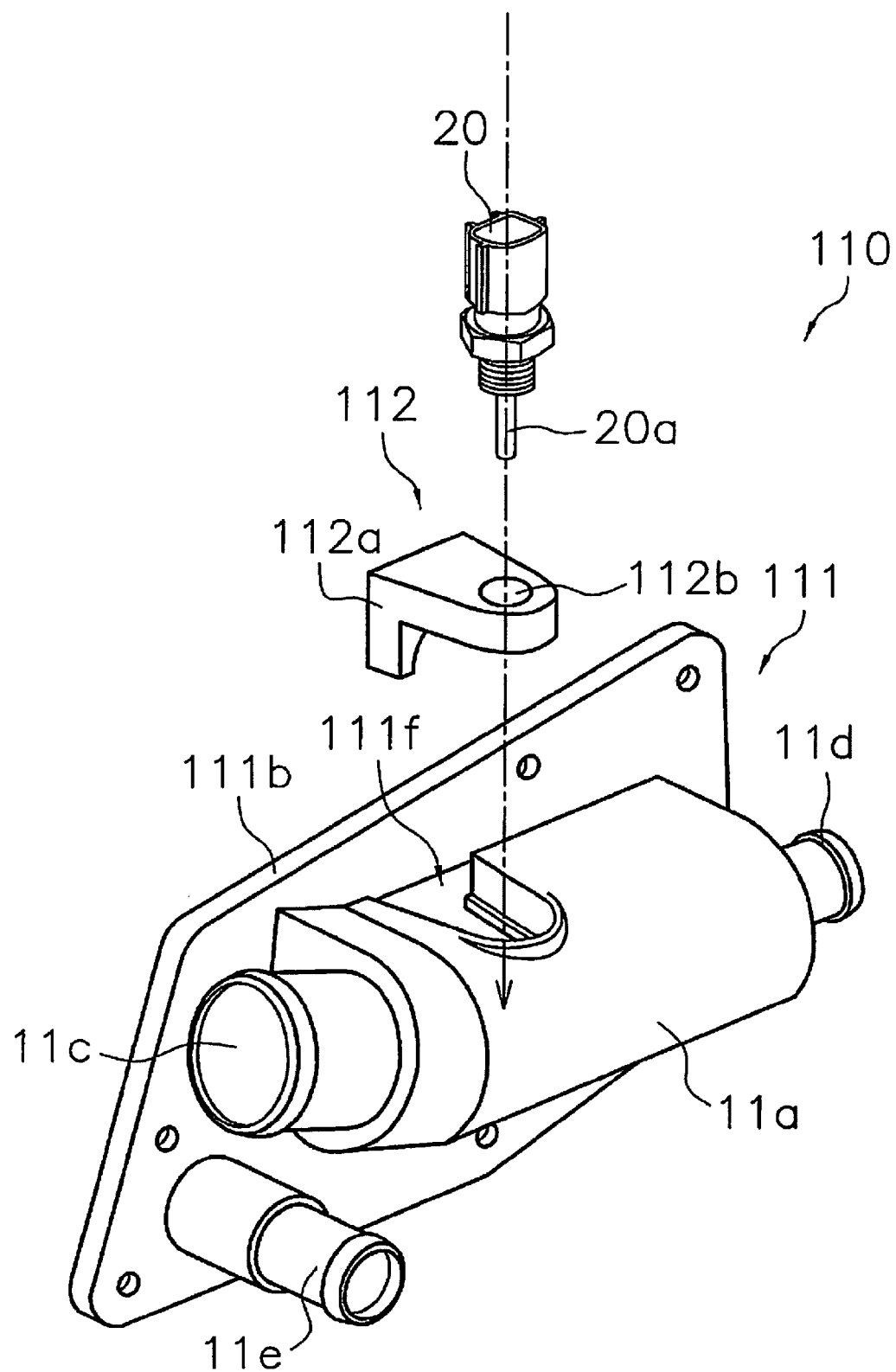
FIG. 10 is an exploded perspective view of the coolant housing of FIG. 8.

The water outlet 111 has the main body part 11a, a joining plate 111b, the first connector 11c, the second connector 11d, the third connector 11e, and an installation recess 111f (see FIG. 10).

Figure 11A:
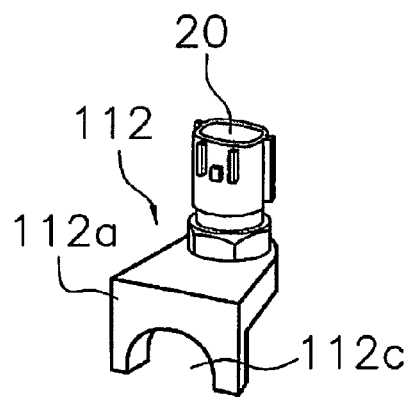
FIG. 11A is a perspective view showing the configuration of the water temperature sensor and attachment part attached to the coolant housing of FIG. 8.
Figure 11B:
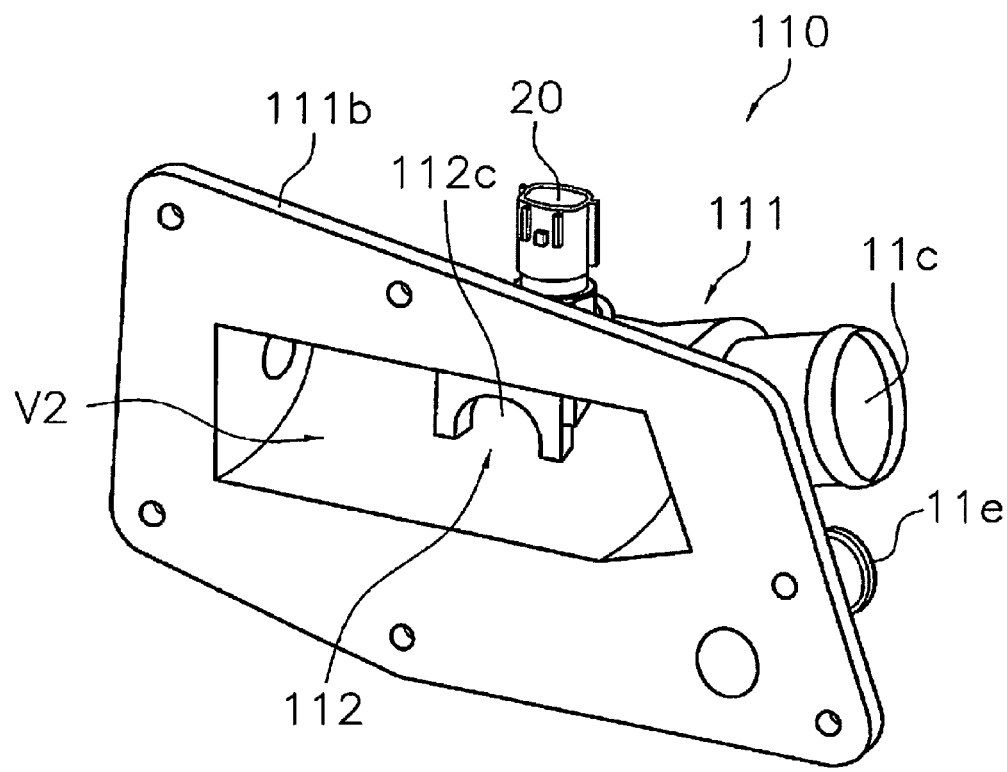
FIG. 11B is a perspective view showing a state in which the water temperature sensor and the attachment part are attached to the water outlet.

The main body part 11a is a substantially cylindrical member having an internal space which constitutes the circulation path V2 (see FIG. 11B, and is disposed in a substantially horizontal direction in a state in which the water outlet 111 is attached to the cylinder head 152. The water temperature sensor 20 is also attached to a top part of the main body part 11a via the attachment part 112. The temperature of the coolant flowing through the circulation path V2 formed in the main body part 11a can thereby be sensed by the water temperature sensor 20 at a temperature sensing part 20a (see FIG. 13) which protrudes into the circulation path V2.

As shown in FIGS. 8 and 9, the joining plate 111b is a plate-shaped member disposed on the side of the main body part 11a that is joined to the cylinder head 152, and one surface of the plate shape of the joining plate 11b is fixed in a state of abutting the cylinder head 152.

As shown in FIG. 10, the installation recess 111f is formed in a top surface of the main body part 11a, and is a through-hole communicated to the circulation path V2, and the attachment part 112 described hereinafter is attached thereto together with the water temperature sensor 20.

Attachment Part 112

As shown in FIG. 10, the attachment part 112 is a metallic member for attaching the water temperature sensor 20 to the main body part 11a of the water outlet 111. The attachment part 112 is attached in liquid-tight fashion to the installation recess 111f so that no gap is formed between the attachment part 112 and the water outlet 111. The attachment part 112 has a main body part 112a, a sensor insertion part 112b, and a notched part 112c (see FIG. 11A).

The main body part 112a is substantially L-shaped as viewed from a side thereof, the notched part 112c is formed in a back surface portion of the substantial L shape, and the sensor insertion part 112b is formed in a top-surface portion thereof.

As shown in FIG. 10, the sensor insertion part 112b is a through-hole into which a temperature sensing part 20a side of the water temperature sensor 20 is inserted and fixed. In the state in which the attachment part 112 is attached to the water outlet 111, the sensor insertion part 112b is communicated with the circulation path V2 formed inside the water outlet 111.

The notched part 112c has a semicircular part formed on a back surface side of the main body part 112a, and a flat part having two substantially parallel surfaces (width across the flat portions) extending tangentially from edges at both ends in the circumferential direction of the semicircular part. The width across the flat portions is formed so that the width thereof is somewhat less than the width across the flat portions of the positioning member 121 described hereinafter, and as shown in FIGS. 12A and 12B, and the positioning member 121 described hereinafter is press-fitted in the notched part 112c in the width across the flat portions, whereby the metal-made positioning member 121 (see FIG. 12A, etc.) is integrally attached to the attachment part 112.

Positioning Member 121

The positioning member 121 is a metal-made member that is provided in a joining portion between the cylinder head 152 and the coolant housing 110, and has a half-cylindrical part and a flat part which has two substantially parallel surfaces (width across the flat portions) extending tangentially from edges at both ends in the circumferential direction of the half-cylindrical part. As described above, the positioning member 121 is press-fitted in the notched part 112c, and positions the integrated attachment part 112, i.e., the coolant housing 110, with respect to the cylinder head 152 in the width direction of the width across the flat portions (the direction at a right angle to the vertical direction).

Furthermore, since the positioning member 121 is molded from a metal-made material, the positioning member 121 also functions as a transmitting member for transmitting heat generated in an engine body 151 (cylinder head 152) to the water temperature sensor 20 via the attachment part 112, which is also molded from a metal-made material.

Figure 13:
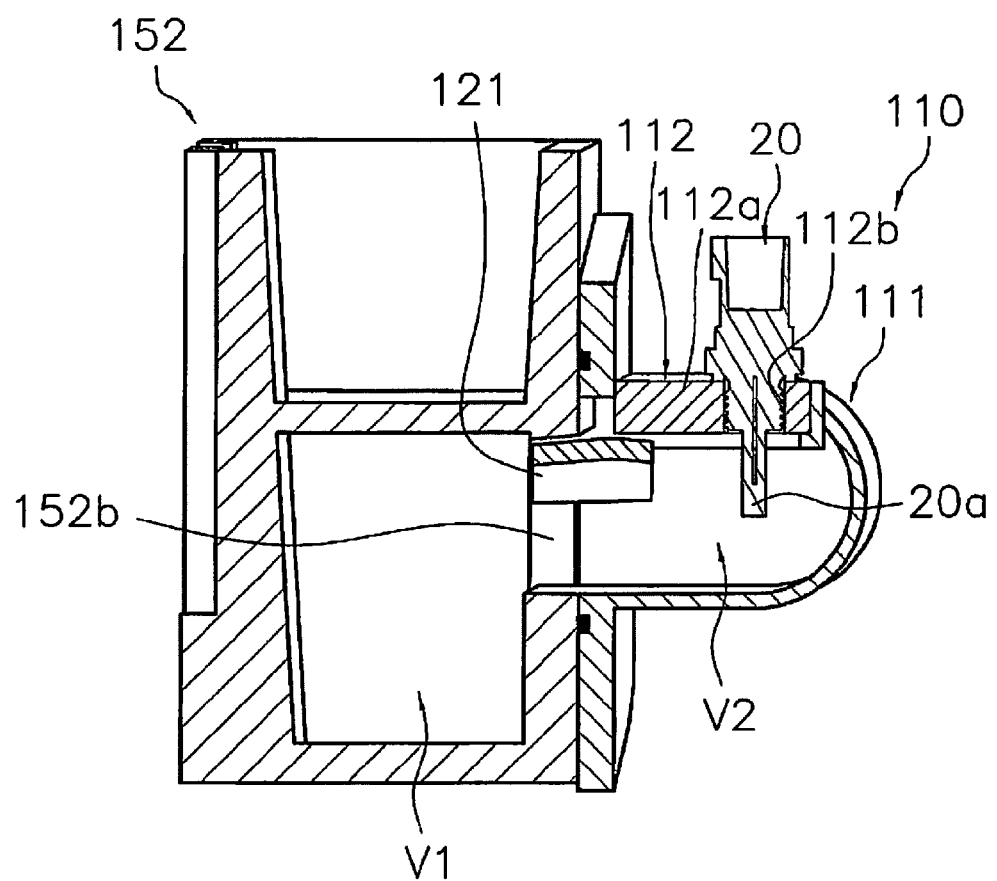
FIG. 13 is an enlarged sectional view showing the configuration of the joining portion between the coolant housing and cylinder head of FIG. 8.

As shown in FIG. 13, the positioning member 121 is shaped so as to taper toward the side thereof that is inserted into the cylinder head 152. Through this configuration, when the coolant housing 110 is attached to the joining face side of the cylinder head 152, the positioning member 121 can be easily inserted toward the insertion hole 152a side even when the positioning member 121 is first inserted in the notched part 112c on the coolant housing 110 side and subsequently inserted in the insertion hole 152a on the cylinder head 152 side as shown in FIG. 12B.

Through a configuration such as described above in the coolant housing 110 for an internal combustion engine according to the present embodiment, effects can be produced that are basically the same as the operations/effects produced by the first embodiment described above.

The description below is of only the operations/effects that differ from the operations/effects produced by the configuration of the first embodiment described above.

<Features>

(1) As shown in FIGS. 12B and 13, in the coolant housing 110 for an internal combustion engine according to the present embodiment, the attachment part 112 is formed having a half-cylindrical shape (arch shape) in a portion where contact is made with the cylinder head 152, so as to stay clear of the portion where the coolant flowing through the circulation path V2 and the temperature sensing part 20a of the water temperature sensor 20 come in contact with each other.

Through this configuration, the flow of coolant is not impeded by the attachment part 112 in the joining portion between the cylinder head 152 and the coolant housing 110, even when the attachment part 112 is provided in a position obstructing the flow upstream from the temperature sensing part 20a of the water temperature sensor 20 in the direction in which the coolant flows in the circulation path V2. The water temperature can therefore be accurately sensed in the water temperature sensor 20.

Other Embodiments

Embodiments of the present invention are described above, but the present invention is not limited to the embodiments described above, and various modifications can be made herein without departing from the scope of the invention.

(A) In the embodiments described above, examples are described in which the attachment parts 12, 112 are integrally attached to the installation recesses 11f, 111f of the water outlets 11, 111 by welding or the like, for example. However, the present invention is not limited to this configuration.

Figure 14:
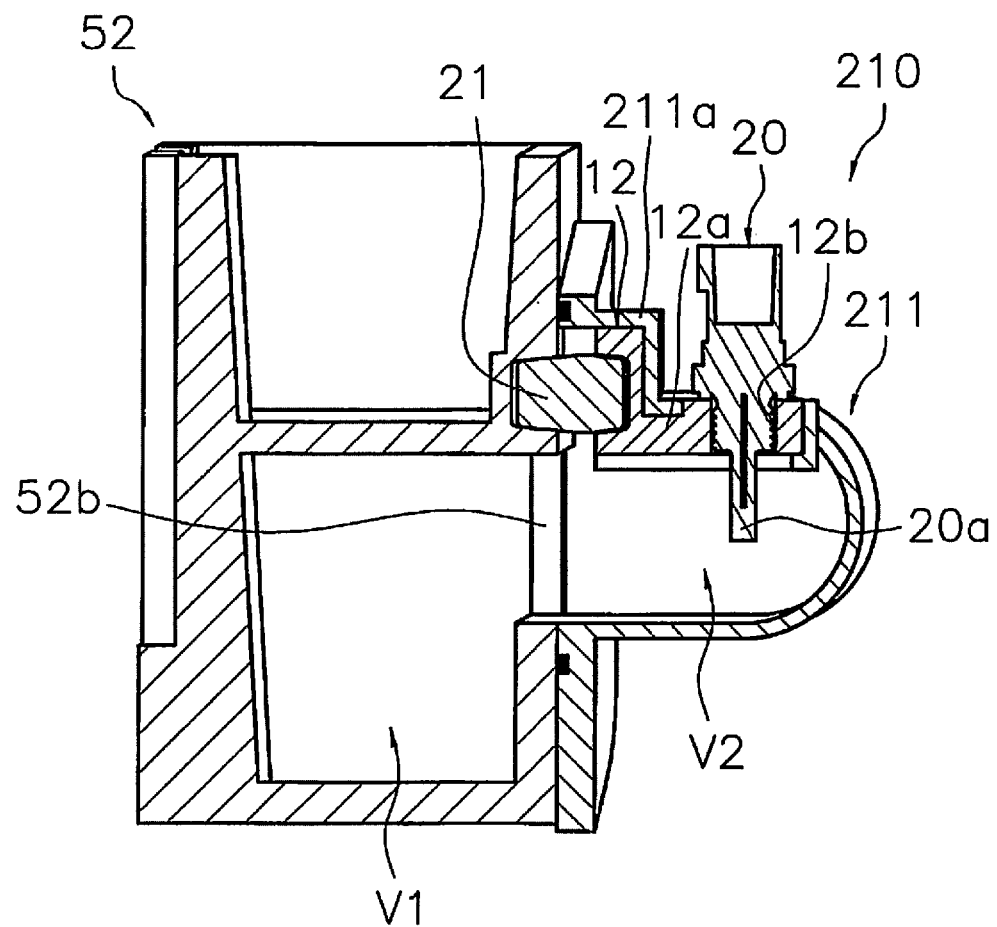
FIG. 14 is an enlarged sectional view showing the configuration of the joining portion between the coolant housing and cylinder head according to another embodiment of the present invention.
Figure 15:
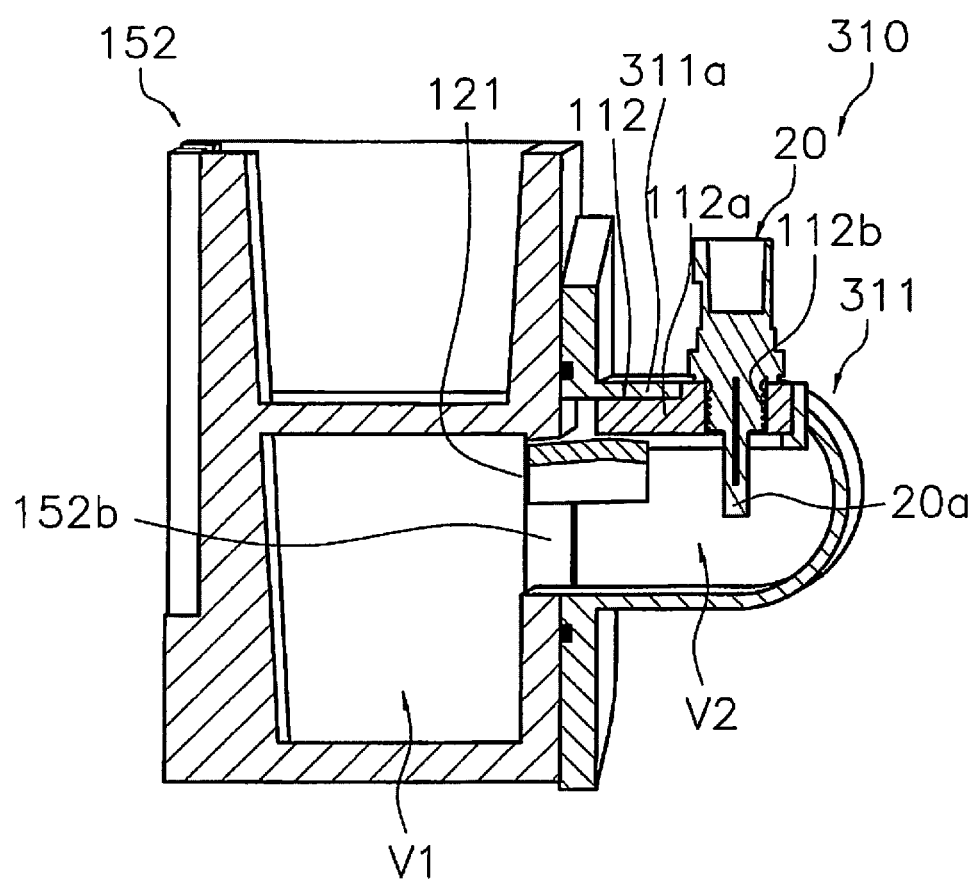
FIG. 15 is an enlarged sectional view showing the configuration of the joining portion between the coolant housing and cylinder head according to another embodiment of the present invention.

For example, the attachment parts 12, 112 may be integrated with the water outlets 11, 111 by insert molding. In this case, cooling housings 210, 310 may be configured which include resin-made water outlets 211, 311 in which covering parts 211a, 311a are formed so as to cover top surfaces of the attachment parts 12, 112, as shown in FIGS. 14 and 15.

Through this configuration, integrated-type water outlets 211, 311 including metal-made attachment parts 12, 112 can be molded by setting the attachment parts 12, 112 in a molding die during insert molding of the resin-made water outlets 211, 311, for example. The majority of each of the metal-made attachment parts 12, 112 is thus insert-cast by the resin-made water outlets 211, 311, and radiation of heat from the attachment parts 12, 112 can thereby be suppressed. Heat generated on the engine body 51, 151 (cylinder head 52, 152) side can therefore be more reliably transmitted to the water temperature sensor 20 side.

(B) In the embodiments described above, examples are described in which the attachment parts 12, 112 and the positioning members 21, 121 are provided as separate elements. However, the present invention is not limited to this configuration.

For example, a configuration may be adopted in which the transmitting member and the attachment part are integrated.

(C) In the embodiments described above, examples are described in which the attachment part 12 and the positioning member (transmitting member) 21 are both made of a metal having high thermal conductivity. However, the present invention is not limited to this configuration.

For example, the attachment part or the transmitting member may be formed from a nonmetal material having high thermal conductivity.

(D) In the first embodiment described above, an example is described in which the insertion hole 52a is formed so that the width of the insertion hole 52a in the longitudinal direction is somewhat larger than the width of the positioning member 21 in the longitudinal direction in a state in which the positioning member 21 is inserted in the insertion hole 52a, and a gap g formed in the width direction in this longitudinal direction is thereby caused to function as a pressure relief part for alleviating pressure when the positioning member 21 is fitted in the insertion hole 52a formed on the cylinder head 52 side, as shown in FIG. 7B. However, the present invention is not limited to this configuration.

Figure 16A:
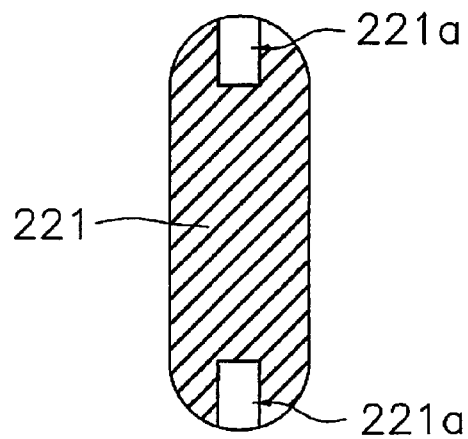
FIGS. 16A and 16B are partial enlarged views showing the size relationship between the positioning member and the insertion hole in the joining portion between the coolant housing and cylinder head according to another embodiment of the present invention.

For example, at least one notched part 221a, 221a may be formed in a portion of a positioning member 221, and the notched part 221a, 221a may be caused to function as a pressure relief part, as shown in FIG. 16A.

Figure 16B:
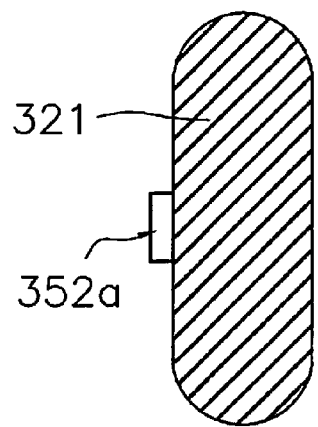
Figure 17:
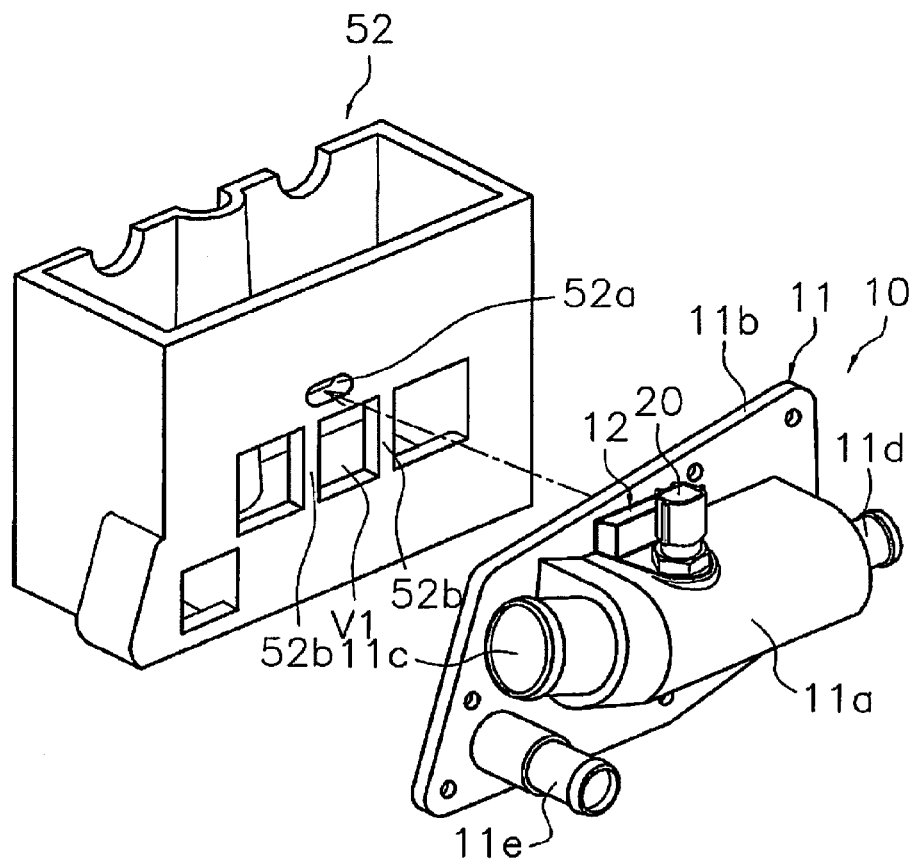
FIG. 17 is a perspective view showing the configuration of the area surrounding the joining portion between the coolant housing and cylinder head according to another embodiment of the present invention.
Figure 18A:
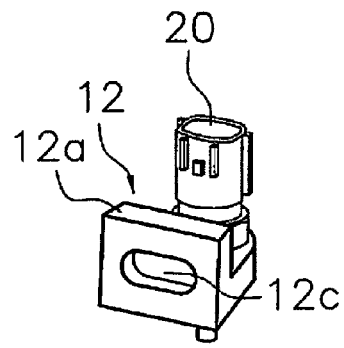
FIG. 18A is a perspective view showing the configuration of the water temperature sensor and attachment part attached to the coolant housing of FIG. 17.
Figure 18B:
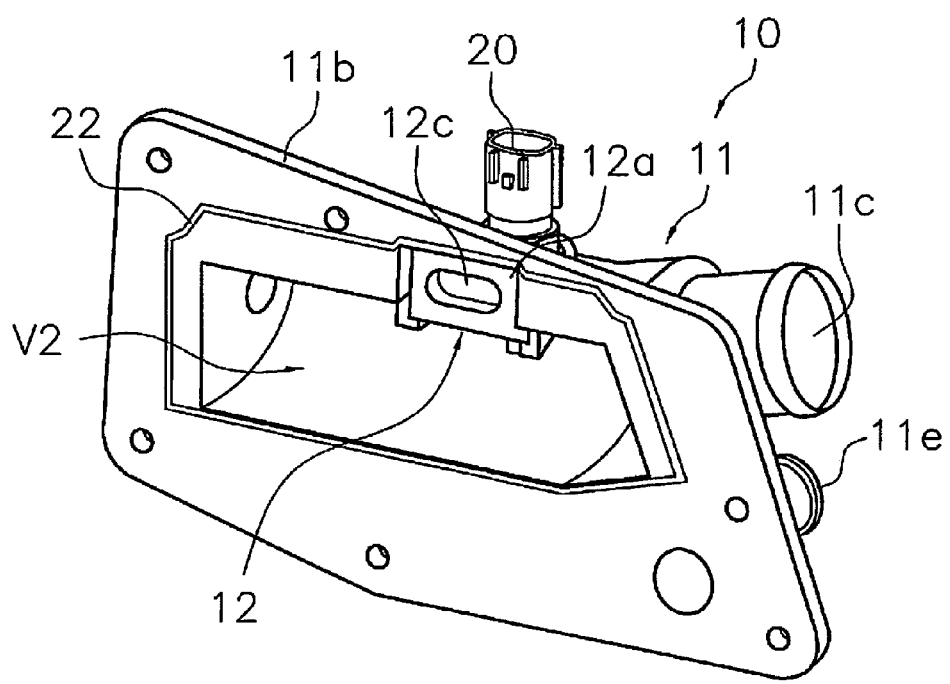
FIG. 18B is a perspective view showing a state in which the water temperature sensor and the attachment part are attached to the water outlet.
Figure 20A:
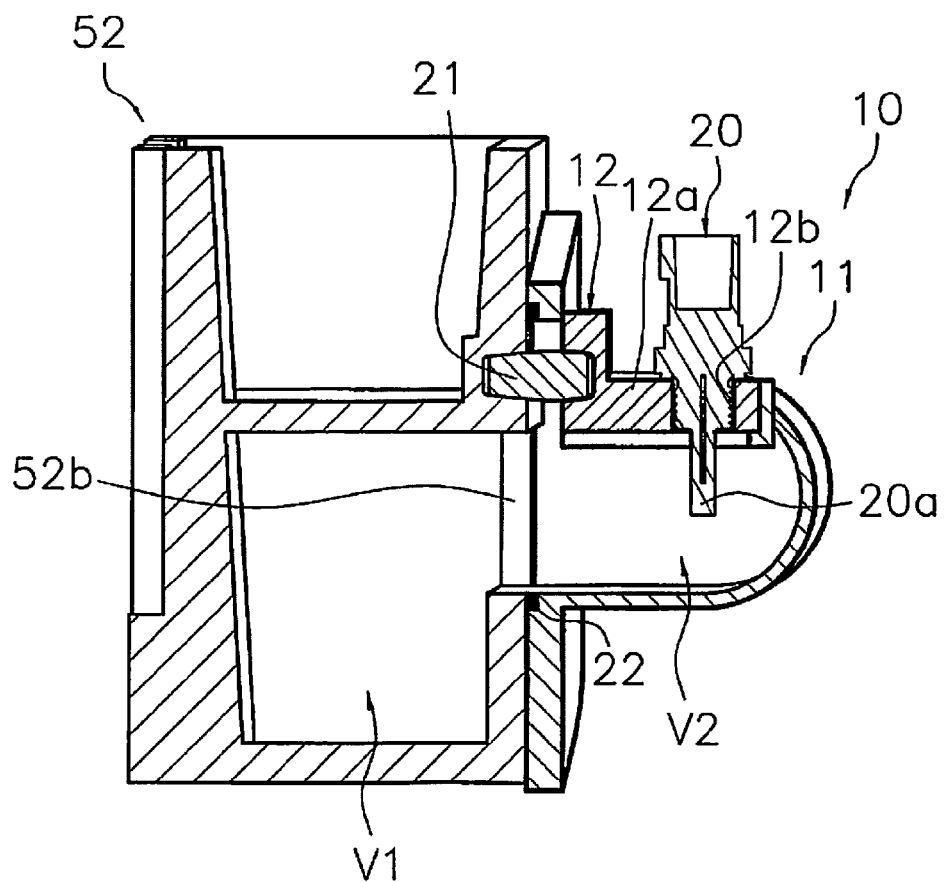
FIG. 20A is an enlarged sectional view showing the configuration of the joining portion between the coolant housing and cylinder head of FIG. 17.
Figure 20B:
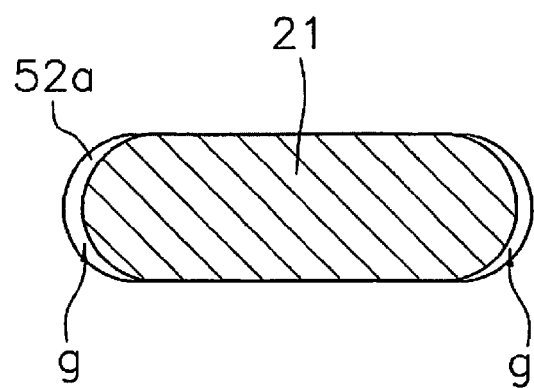
FIG. 20B is a partial enlarged view showing the size relationship between the positioning member and the insertion hole in the joining portion.
Figure 21:
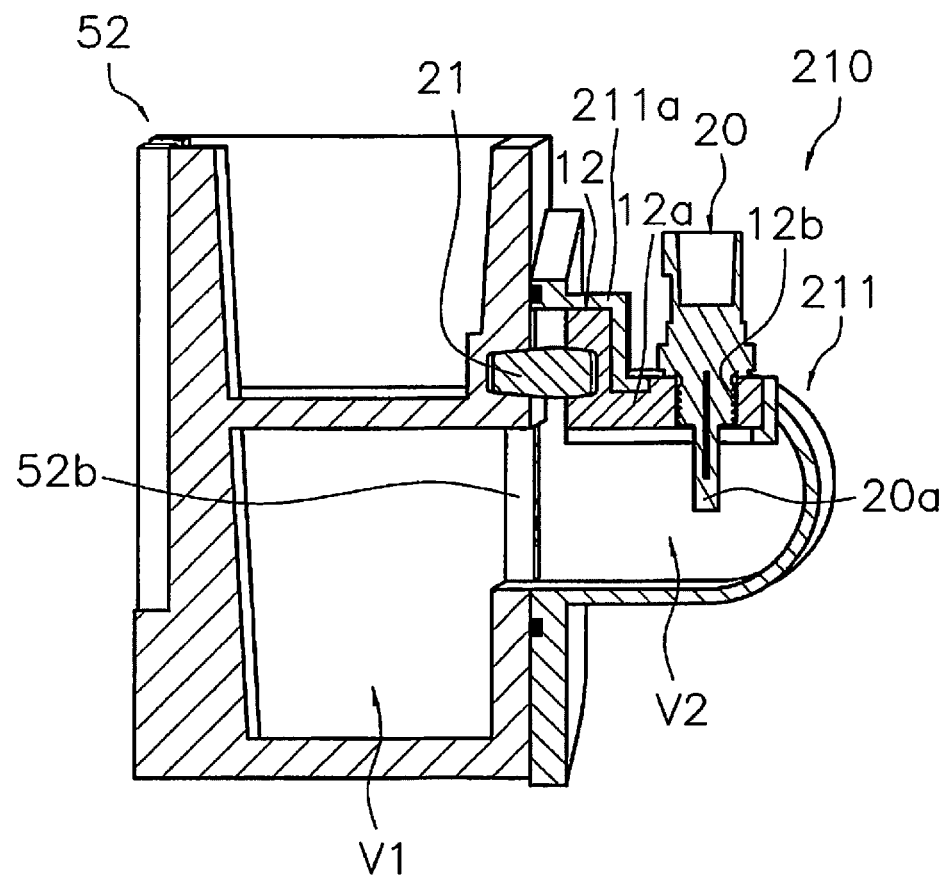
FIG. 21 is an enlarged sectional view showing the configuration of the joining portion between the coolant housing and cylinder head according to another embodiment of the present invention.

As shown in FIG. 16B, at least one recess 352a formed on the insertion hole 52a side on which a positioning member 321 is inserted may also be caused to function as a pressure relief part.

(E) In the first embodiment and the other embodiment (A) described above, examples are described in which the insertion hole 52a on the cylinder head 52 side and the insertion hole 12c on the attachment part 12 side are each formed so as to have a vertically elongated shape, and the positioning member 21 is inserted in the insertion holes in a state in which the longitudinal direction of the elliptical shape thereof is aligned in a vertical direction, as shown in FIGS. 3 through 7B and 14. However, the present invention is not limited to this configuration.

For example, as shown in FIGS. 17 through 21, a configuration may be adopted in which the insertion hole 52a and the insertion hole 12c are formed so as to have a laterally elongated shape, the longitudinal direction of which is in a substantially horizontal direction, and the positioning member 21 is also laterally elongated and inserted therein.

(F) In the first and second embodiments and the other embodiments (A) through (E) described above, examples are described in which rib parts 52b, 52b for connecting a combustion-chamber-proximal part and an insertion-hole-52a-proximal part are provided in an open part constituting the circulation path V1 in the cylinder head 52, and rib parts 152b, 152b are provided which constitute an open part constituting the circulation path V1 in the cylinder head 152. However, the present invention is not limited to this configuration.

For example, the rib parts 52b, 52b, 152b, 152b may not be provided in an opening constituting the circulation path V1 in the cylinder heads 52, 152.

Figure 22:
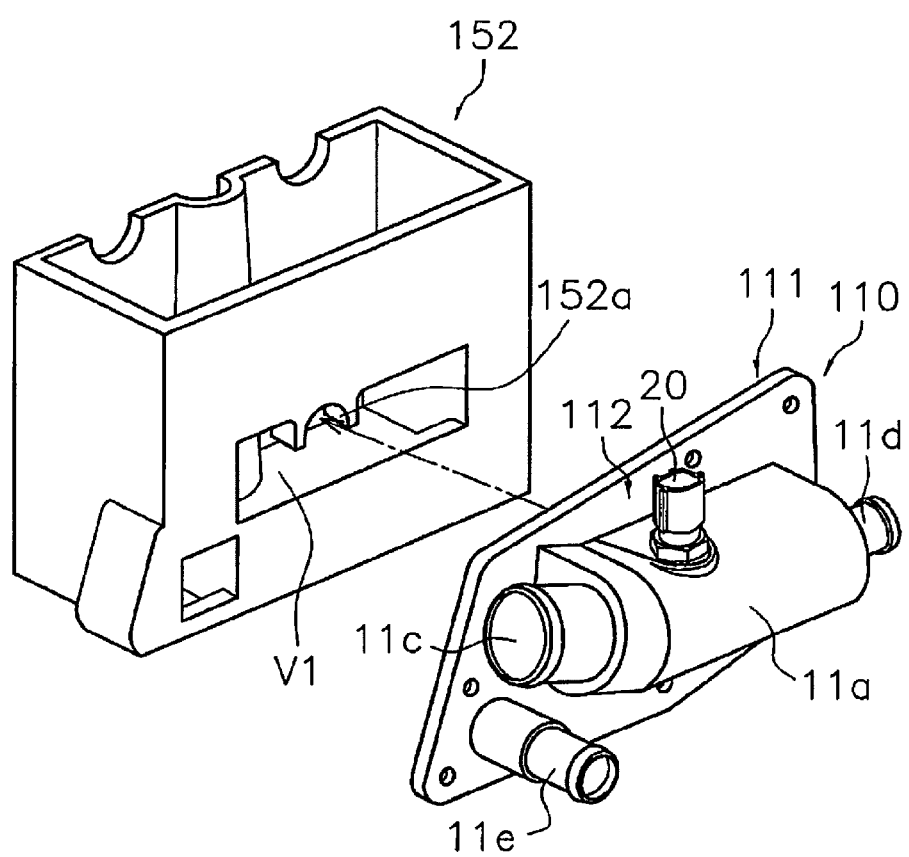
FIG. 22 is an enlarged sectional view showing the configuration of the joining portion between the coolant housing and cylinder head according to another embodiment of the present invention.
Figure 23:
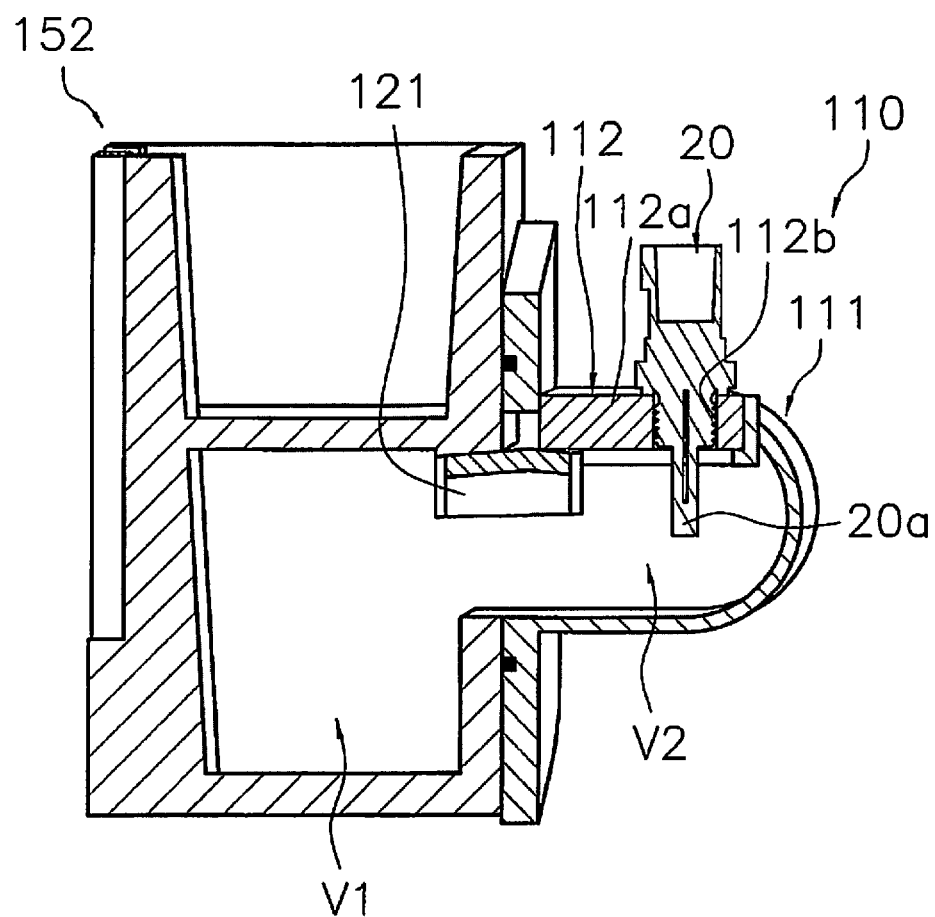
FIG. 23 is an enlarged sectional view showing the configuration of the joining portion between the coolant housing and cylinder head according to another embodiment of the present invention.
Figure 24:
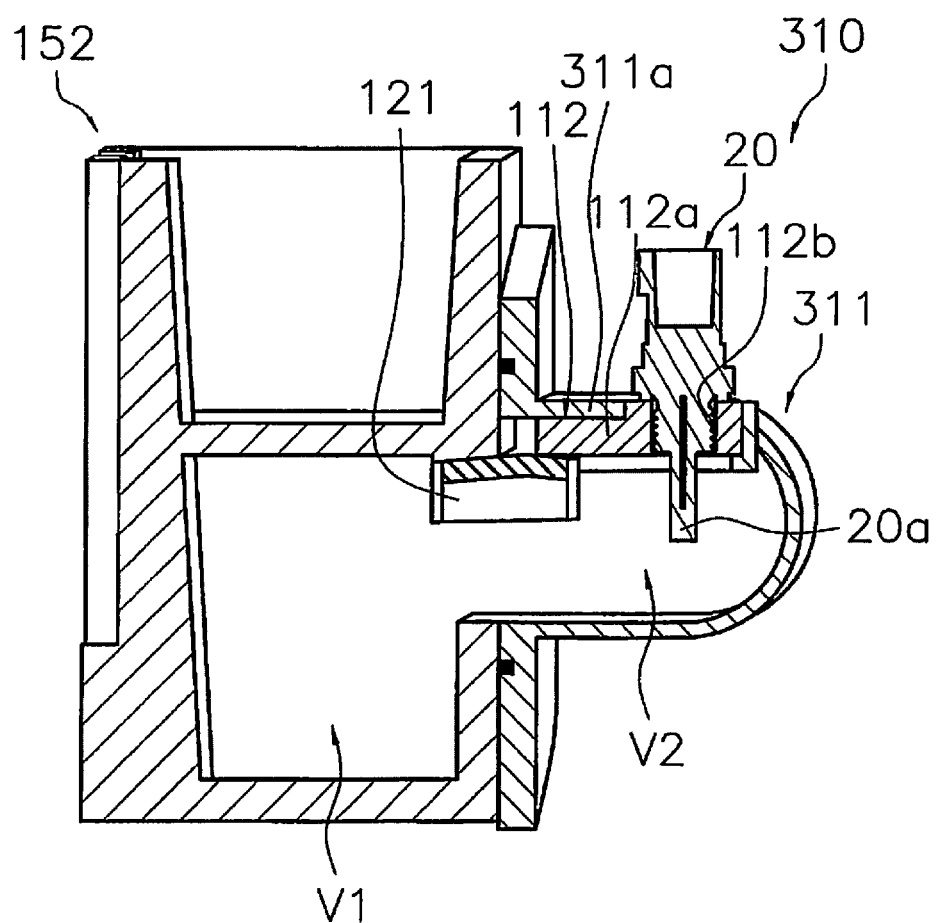
FIG. 24 is an enlarged sectional view showing the configuration of the joining portion between the coolant housing and cylinder head according to another embodiment of the present invention.

When the insertion hole 152a or the positioning member 121 is in the form of an arch shape (see FIGS. 9 and 15), a configuration may be adopted in which only the insertion hole 152a is provided in the top part of the space constituting the circulation path V1, as shown in FIGS. 22 to 24.

(G) In the first embodiment described above, an example is described in which two rib parts 52b, 52b are provided below the insertion hole 52a on the cylinder head 52 side so as to divide the circulation path V1. However, the present invention is not limited to this configuration.

Figure 25:
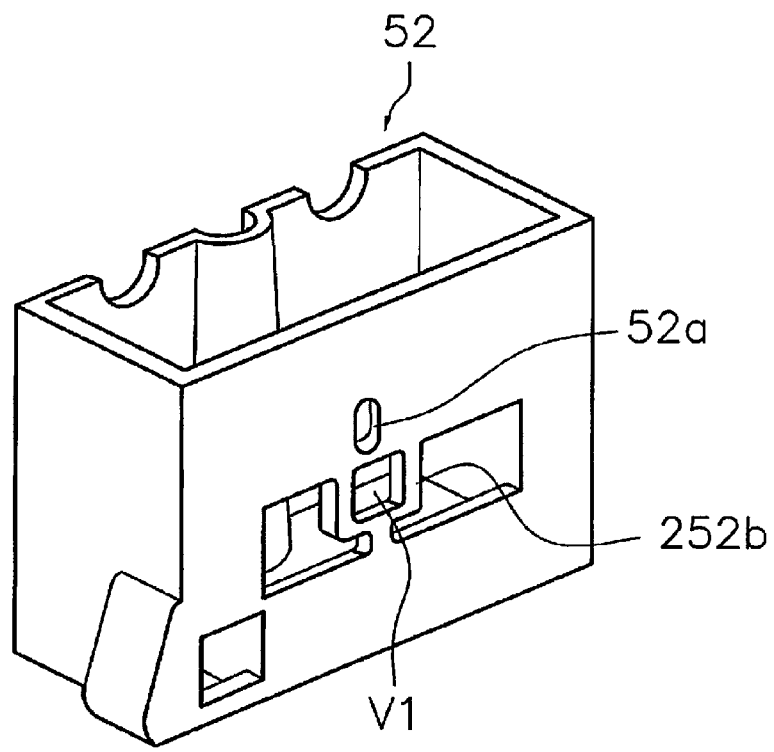
FIG. 25 is a perspective view showing the shape of a rib part provided on the cylinder head side according to another embodiment of the present invention.

For example, a substantially Y-shaped rib part 252b may be provided below the insertion hole 52a, as shown in FIG. 25.

Figure 26:
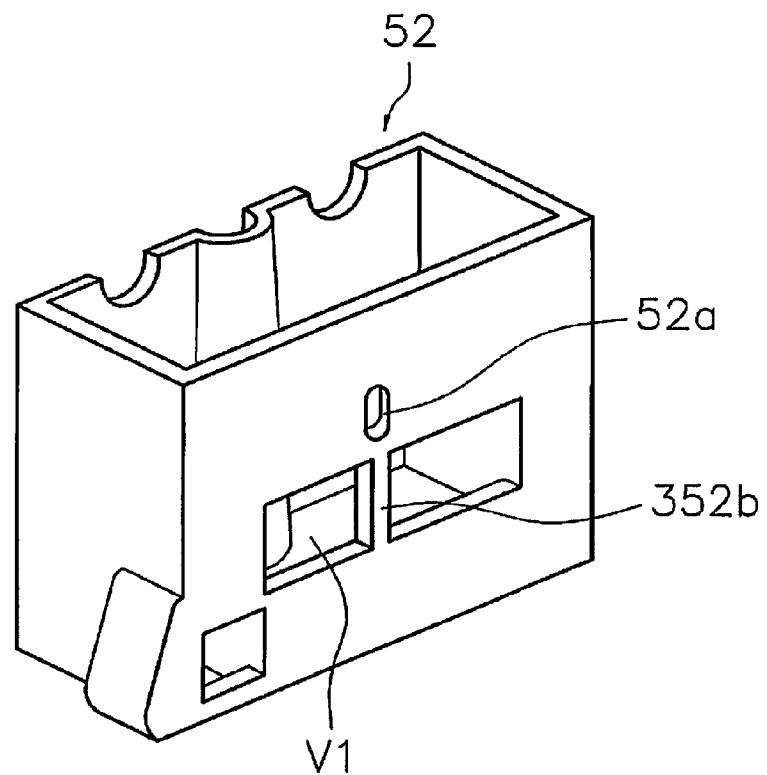
FIG. 26 is a perspective view showing the shape of a rib part provided on the cylinder head side according to another embodiment of the present invention.

As shown in FIG. 26, a single rib part 352b may be provided below the insertion hole 52a.

In this case as well, heat is transmitted linearly via the rib parts 252b, 352b when heat is transmitted from below the cylinder head 52 in which a combustion chamber of the internal combustion engine is disposed. As a result, the heat of the combustion chamber during an instance of overheating can be more efficiently transmitted to the water temperature sensor 20 without inhibition of the flow of coolant through the circulation path V1 toward the water temperature sensor 20. An instance of overheating can thereby be sensed at a relatively early stage in comparison with a configuration in which rib parts are not provided.

(H) In the embodiments and other embodiments described above, examples are described in which the attachment parts 12, 112 are disposed further inside than is the seal member 22 (closer to the circulation path V2 than is the seal member 22). However, the present invention is not limited to this configuration.

For example, the attachment parts 12, 112 may be disposed further outside than is the seal member 22 (on the opposite side of the seal member 22 from the circulation path V2).

Figure 27:
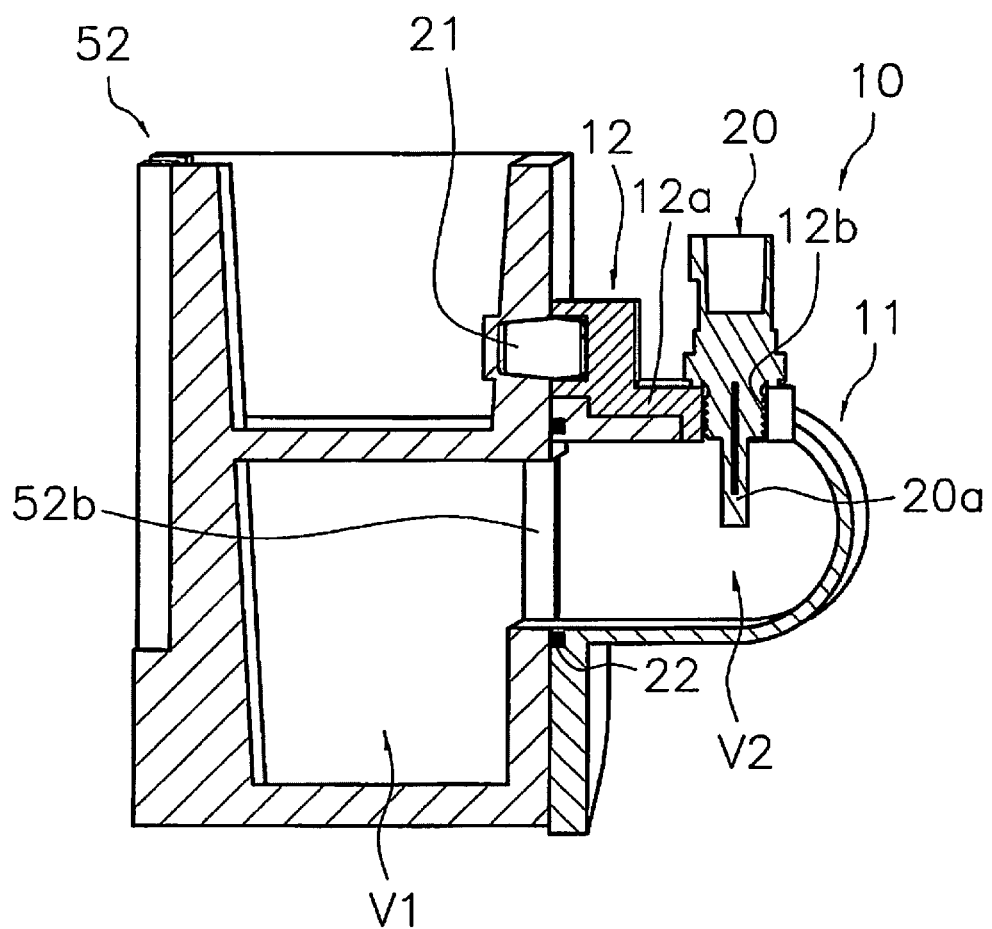
FIG. 27 is an enlarged sectional view showing the configuration of the joining portion between the coolant housing and cylinder head according to another embodiment of the present invention.
Figure 28:
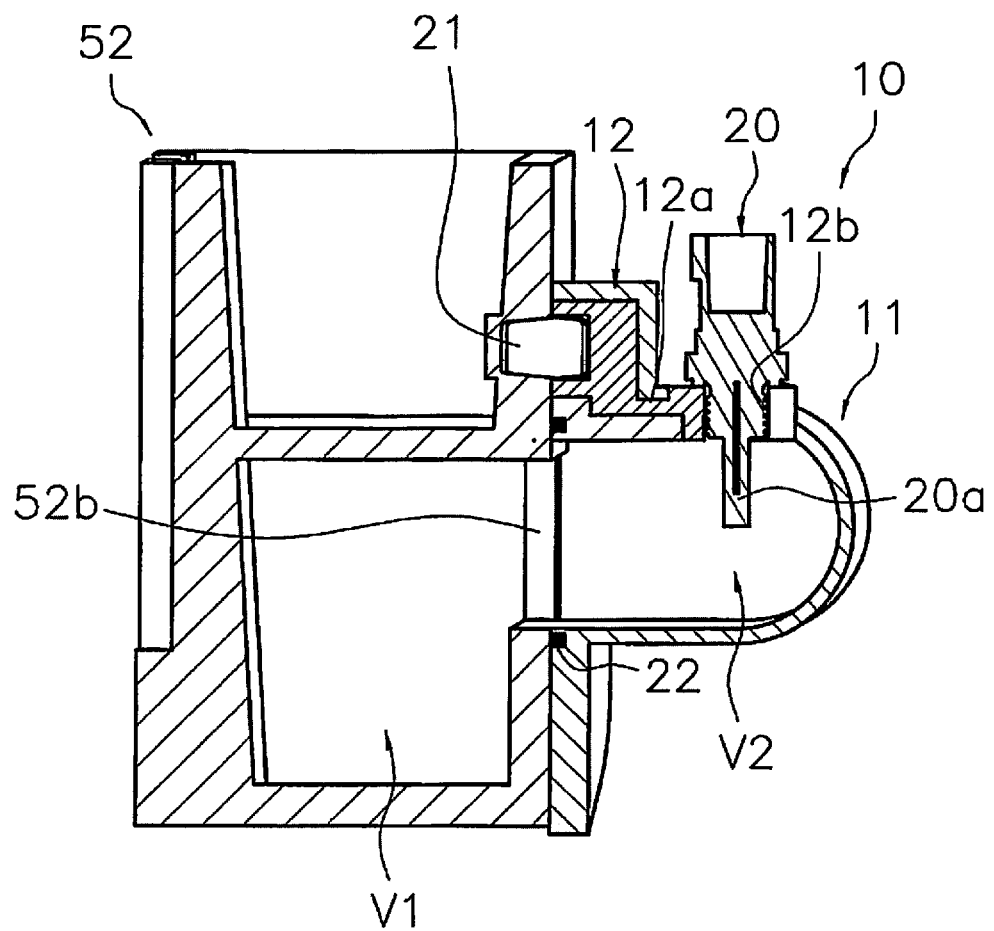
FIG. 28 is an enlarged sectional view showing the configuration of the joining portion between the coolant housing and cylinder head according to another embodiment of the present invention.

FIGS. 27 and 28 show examples in which the attachment parts 12, 112 are disposed further outside than is the seal member 22 (on the opposite side of the seal member 22 from the circulation path V2) in FIGS. 7 and 14.

In this case as well, the coolant flowing through the circulation paths V1, V2 can be prevented from leaking out from the joining portion.

The retaining structure for a temperature detection device according to the present invention makes it possible to accurately sense the temperature of the engine body and quickly detect overheating without melting of a resin-made cooling medium circulation part for circulating a cooling medium, and is therefore widely applicable to various types of internal combustion engines provided with a coolant housing.

The invention claimed is:

1. A retaining structure for a temperature detection device, comprising:
   a resin cooling medium circulation part forming form a portion of a circulation path for circulating a cooling medium for cooling an engine body; and
   an attachment part retaining the temperature detection device for sensing the temperature of the cooling medium flowing through the circulation path, so that a temperature sensing part of the temperature detection device protrudes into the circulation path, the attachment part being a material capable of transmitting heat from the engine body to the temperature detection device, and being attached to the resin cooling medium circulation part such that a portion of the attachment part is configured to contact the engine body,
   the attachment part having an abutting part configured to abut the engine body and position the cooling medium circulation part with respect to the engine body,
   the abutting part being configured to be fixed to the engine body, such that opposing surfaces of the engine body and the abutting part contact and form a recess on a side of the engine body, and
   the abutting part protruding from the resin cooling medium circulation part and being configured to be inserted in the recess formed on the side of the engine body, thereby positioning the resin cooling medium circulation part with respect to the engine body.

2. The retaining structure for a temperature detection device according to claim 1, wherein
   the attachment part is attached to the resin cooling medium circulation part so that the temperature detection device is to be disposed in a top part of the circulation path.

3. The retaining structure for a temperature detection device according to claim 1, wherein
   a portion of the attachment part excluding the portion configured to contact the engine body is covered by the resin cooling medium circulation part.

4. The retaining structure for a temperature detection device according to claim 1, wherein
   the attachment part has a shape whereby contact is not obstructed between the cooling medium flowing through the circulation path and a temperature sensing part of the temperature detection device.

5. The retaining structure for a temperature detection device according to claim 1, wherein
   the abutting part is configured to abut the engine body in a planar manner.

6. The retaining structure for a temperature detection device according to claim 5, wherein
   the attachment part has a retaining part configured to retain the temperature detection device, and the abutting part is a transmitting member configured to be disposed in a joining portion between the resin cooling medium circulation part and the engine body and is configured to transmit heat of the engine body to the attachment part.

7. The retaining structure for a temperature detection device according to claim 1, wherein
   the abutting part has a shape that narrows toward a distal end thereof on a side thereof that is inserted into the recess on the side of the engine body.

8. The retaining structure for a temperature detection device according to claim 1,
   the abutting part fits into the recess on the side of the engine body, and
   a pressure relief part is disposed so as to relieve pressure when the abutting part is fit into the recess on the side of the engine body, the pressure relief part being disposed in an area where the abutting part is fit into the recess.

9. The retaining structure for a temperature detection device according claim 5, wherein
   the abutting part is disposed so that a longitudinal direction thereof in a sectional view is oriented in a substantially vertical direction.

10. The retaining structure for a temperature detection device according to claim 1,
    the resin cooling medium circulation part has a seal part configured to prevent the cooling medium from leaking out, the seal part disposed on a joining surface of the resin cooling medium circulation part with the engine body, and
    the attachment part is configured to contact the engine body in an inside of the seal part.

11. The retaining structure for a temperature detection device according to claim 1, wherein
    the attachment part is metal.

12. An internal combustion engine comprising:
    the retaining structure for a temperature detection device according to claim 1;
    a cooling device; and
    an engine body cooled by the cooling medium.

13. A retaining structure for a temperature detection device, comprising:
    a resin cooling medium circulation part forming a portion of a circulation path for circulating a cooling medium for cooling an engine body;
    an attachment part retaining the temperature detection device for sensing the temperature of the cooling medium flowing through the circulation path, so that a temperature sensing part of the temperature detection device protrudes into the circulation path, the attachment part being a material capable of transmitting heat from the engine body to the temperature detection device, and being attached to the resin cooling medium circulation part such that a portion of the attachment part is configured to contact the engine body,
    the attachment part having an abutting part configured to abut the engine body and position the cooling medium circulation part with respect to the engine body, the abutting part being configured to be fixed to the engine body, such that opposing surfaces of the engine body and the abutting part contact and form a recess on a side of the engine body, and the abutting part protruding from the resin cooling medium circulation part and being configured to be inserted in the recess formed on the side of the engine body, thereby positioning the resin cooling medium circulation part with respect to the engine body; and a rib part disposed in the circulation path, the rib part configured to connect an area of a combustion chamber formed in the engine body and an area of a portion abutted by the attachment part.

* * * * *